US010933595B2

(12) United States Patent
Matsumoto et al.

(10) Patent No.: US 10,933,595 B2
(45) Date of Patent: Mar. 2, 2021

(54) LAMINATED COMPOSITE STRUCTURES WITH INTERLAMINAR CORRUGATIONS TO IMPROVE IMPACT DAMAGE RESISTANCE, AND SYSTEM AND METHOD OF FORMING THE SAME

(71) Applicant: The Boeing Company, Chicago, IL (US)

(72) Inventors: Noah T. Matsumoto, Lancaster, CA (US); Bernice E. Terrell, Everett, WA (US); Michael A. Lee, Kent, WA (US); John D. Morris, Seattle, WA (US)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 15/898,214

(22) Filed: Feb. 15, 2018

(65) Prior Publication Data

US 2020/0061937 A1    Feb. 27, 2020

(51) Int. Cl.
*B29C 70/34* (2006.01)
*B29C 70/54* (2006.01)
*B29L 31/30* (2006.01)

(52) U.S. Cl.
CPC ............ *B29C 70/342* (2013.01); *B29C 70/54* (2013.01); *B29L 2031/3076* (2013.01)

(58) Field of Classification Search
CPC .............................. B29C 70/342; B29C 70/54
See application file for complete search history.

(56) References Cited

U.S. PATENT DOCUMENTS

| | | | |
|---|---|---|---|
| 2006/0249626 | A1 | 11/2006 | Simpson et al. |
| 2009/0283635 | A1 | 11/2009 | Gerken et al. |
| 2016/0159453 | A1 | 6/2016 | Korenaga et al. |
| 2016/0193806 | A1 | 7/2016 | Balabanov et al. |

OTHER PUBLICATIONS

European Patent Office (EPO) Office Action Communication, dated Sep. 2, 2019, for counterpart foreign application No. EP 18214713. 2, Applicant The Boeing Company, 6 pages.

*Primary Examiner* — Ryan M Ochylski

(57) ABSTRACT

There is provided a laminated composite structure having improved impact damage resistance and improved strength. The laminated composite structure has a plurality of stacked layers of a composite material. The plurality of stacked layers have one or more interlaminar corrugations formed within the plurality of stacked layers. Each interlaminar corrugation has a substantially sinusoidal shaped profile, and has a depth and a length dependent on a size of the laminated composite structure formed. The laminated composite structure with the one or more interlaminar corrugations has improved strength and improved impact damage resistance at an exposed edge of the laminated composite structure, when the exposed edge is subjected to an impact force.

20 Claims, 13 Drawing Sheets

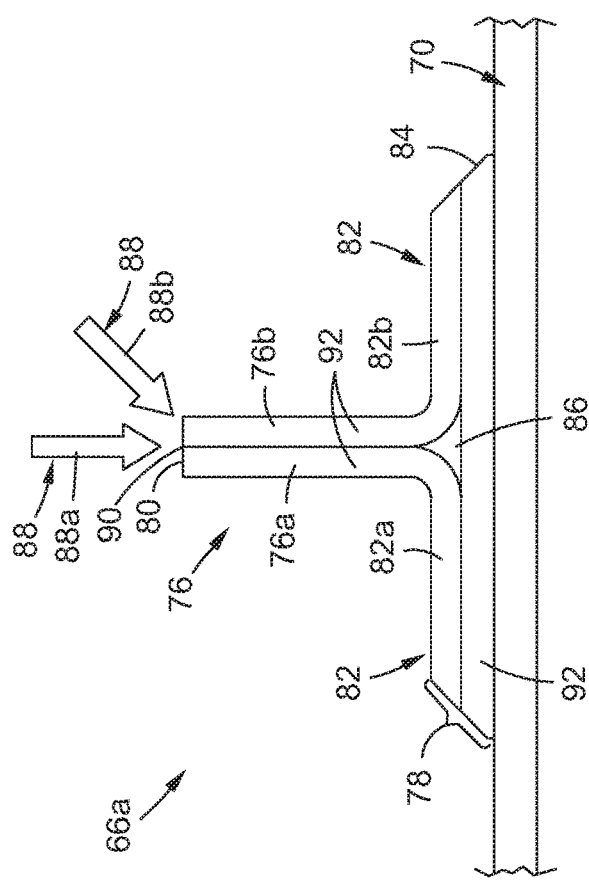
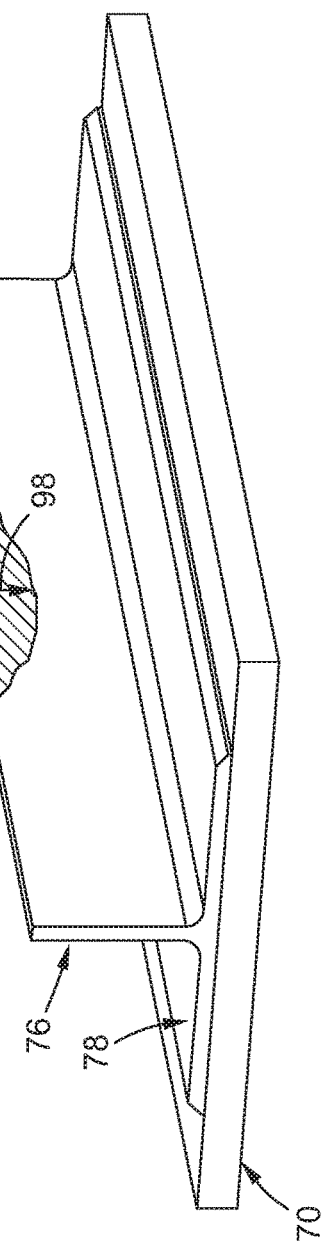
FIG. 5A (PRIOR ART)
FIG. 5B (PRIOR ART)

LAMINATED COMPOSITE STRUCTURES WITH INTERLAMINAR CORRUGATIONS TO IMPROVE IMPACT DAMAGE RESISTANCE, AND SYSTEM AND METHOD OF FORMING THE SAME

BACKGROUND

1) Field of the Disclosure

The disclosure relates generally to laminated composite structures, and systems and methods of making the same, and more particularly, to laminated composite blade stringers, spars, and other aircraft structures, and systems and methods of making the same.

2) Description of Related Art

Composite structures are used in a wide variety of applications. Due to their high strength and low weight structural characteristics, composite structures are used in increasing quantities in aircraft manufacturing to form the fuselage, wings, tail section, and other parts. Aircraft wings may include stringers, such as blade stringers, spars, ribs, and skin panels that may be made of composites, for example, laminated composites. Laminated composites typically consist of multiple layers of fiber-reinforced composite materials joined together with a bonding material, such as adhesive, to provide beneficial properties such as strength, bending stiffness, in-plane stiffness, and load carrying efficiency. In particular, aircraft structural design criteria requires that wing structure be capable of sustaining ultimate loads with barely visible impact damage (BVID), i.e., damage that may be missed by normal visual inspections.

However, laminated composites may be susceptible to damage during fabrication and in-service repairs, when impacted on edges that are exposed or unprotected. For example, when subjected to impact by an object with sufficient energy to cause BVID, internal damage to the laminated composite, such as fiber breakage and delamination, may occur, thus reducing the structural capability of the laminated composite. BVID may be of particular concern for laminated composite blade stringer geometry because of a vertical outer edge of the blade stringer that is exposed or unprotected. Visibility of such impact damage to the laminated composites may be poor, even though the internal damage may be quite significant. Thus, laminated composite structures typically need to be designed to account for fairly significant damage which may increase the manufacturing costs, may increase the weight, and overall, may decrease the performance.

Known devices and methods exist to alleviate BVID of laminated composites. One such known device and method involves an edge or cap covering consisting of multiple material layers, such as fiberglass layers, designed to cover the exposed vertical outer edge of the laminated composite, such as a laminated composite blade stringer. This may improve the damage indication, which, in turn, may improve the threshold of detection, thus allowing the laminated composite to be designed for reduced levels of damage. However, such known edge or cap covering may require the use of additional materials during fabrication of the laminated composite, which, in turn, may increase the cost of manufacturing. Moreover, such known edge or cap covering may require additional manufacturing steps, which, in turn, may increase the time, labor, and cost of manufacturing.

In addition, other known devices and methods exist to alleviate BVID of laminated composites. Such known devices and methods involve improving damage resistance through the application of secondary structures, such as structural overwraps and stitching to the laminated composites. Structural overwraps may include mechanical devices, such as clips, that aid in holding the laminated composite together when it is impacted, or may include mechanical indicators that indicate or show the start of initial damage. Stitching involves stitching a high-strength fiber between the layers of the laminated composite prior to cure to reduce delamination. However, such known structural overwraps and stitching may require the use of additional materials during fabrication of the laminated composite, which, in turn, may increase the cost of manufacturing. Moreover, such known structural overwraps and stitching may require additional manufacturing steps, which, in turn, may increase the time, labor, and cost of manufacturing.

Accordingly, there is a need in the art for an improved apparatus, system, and method for providing laminated composite structures with improved impact damage resistance that may be easily integrated into the fabrication process without the need for added materials, secondary structures, and added manufacturing steps, and that provide advantages over known devices, systems, and methods.

SUMMARY

Example implementations of this disclosure provide for an improved apparatus, system, and method for providing laminated composite structures with improved impact damage resistance. As discussed in the below detailed description, versions of the improved apparatus, system, and method for providing laminated composite structures with improved impact damage resistance may provide significant advantages over known devices, systems, and methods.

In one version there is provided a laminated composite structure having improved impact damage resistance and improved strength. The laminated composite structure comprises a plurality of stacked layers comprised of a composite material. The plurality of stacked layers has one or more interlaminar corrugations formed within the plurality of stacked layers. Each interlaminar corrugation has a substantially sinusoidal shaped profile, and has a depth and a length dependent on a size of the laminated composite structure formed. The laminated composite structure with the one or more interlaminar corrugations has improved strength and improved impact damage resistance at an exposed edge of the laminated composite structure, when the exposed edge is subjected to an impact force.

In another version there is provided a system for forming a laminated composite structure having one or more interlaminar corrugations, and having improved impact damage resistance and improved strength. The system comprises a laminate assembly.

The laminate assembly comprises a first laminate coupled to a second laminate. The first laminate is coupled to a first tool plate, and the second laminate is coupled to a second tool plate. The laminate assembly further comprises one or more gap elements coupled between the first laminate and the second laminate. The one or more gap elements form a gap area between the first laminate and the second laminate.

The system further comprises a pressurizing system coupled to the laminate assembly, to create a low pressure region in the gap area for forming the one or more interlaminar corrugations, during consolidation and curing of the laminate assembly, and to form the laminated composite structure having the one or more interlaminar corrugations. The laminated composite structure with the one or more interlaminar corrugations has improved strength and improved impact damage resistance at an exposed edge of the laminated composite structure, when the exposed edge is subjected to an impact force.

In another version there is provided a method of forming a laminated composite structure having one or more interlaminar corrugations, and having improved impact damage resistance and improved strength. The method comprises the step of forming a laminate assembly comprising at least a first laminate coupled to a second laminate, and one or more gap elements coupled between the first laminate and the second laminate, to form a gap area between the first laminate and the second laminate.

The method further comprises the step of using a pressurizing system to consolidate the laminate assembly, and to create a low pressure region in the gap area for forming the one or more interlaminar corrugations. The method further comprises curing the laminate assembly to form the laminated composite structure having the one or more interlaminar corrugations, wherein the formed laminated composite structure has improved impact damage resistance and improved strength.

The features, functions, and advantages that have been discussed can be achieved independently in various versions or embodiments of the disclosure or may be combined in yet other versions or embodiments, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein:

FIG. 5A is an illustration of a cross-sectional view of a known laminated composite blade stringer showing an impact location at an exposed edge;

FIG. 5B is an illustration of a perspective view of a known laminated composite blade stringer showing an impact damage area;

Each figure shown in this disclosure shows a variation of an aspect of the embodiments presented, and only differences will be discussed in detail.

DETAILED DESCRIPTION

Disclosed versions or embodiments will now be described more fully hereinafter with reference to the accompanying drawings, in which some, but not all of the disclosed versions or embodiments are shown. Indeed, several different versions or embodiments may be provided and should not be construed as limited to the versions or embodiments set forth herein. Rather, these versions or embodiments are provided so that this disclosure will be thorough and fully convey the scope of the disclosure to those skilled in the art.

Figure 1:
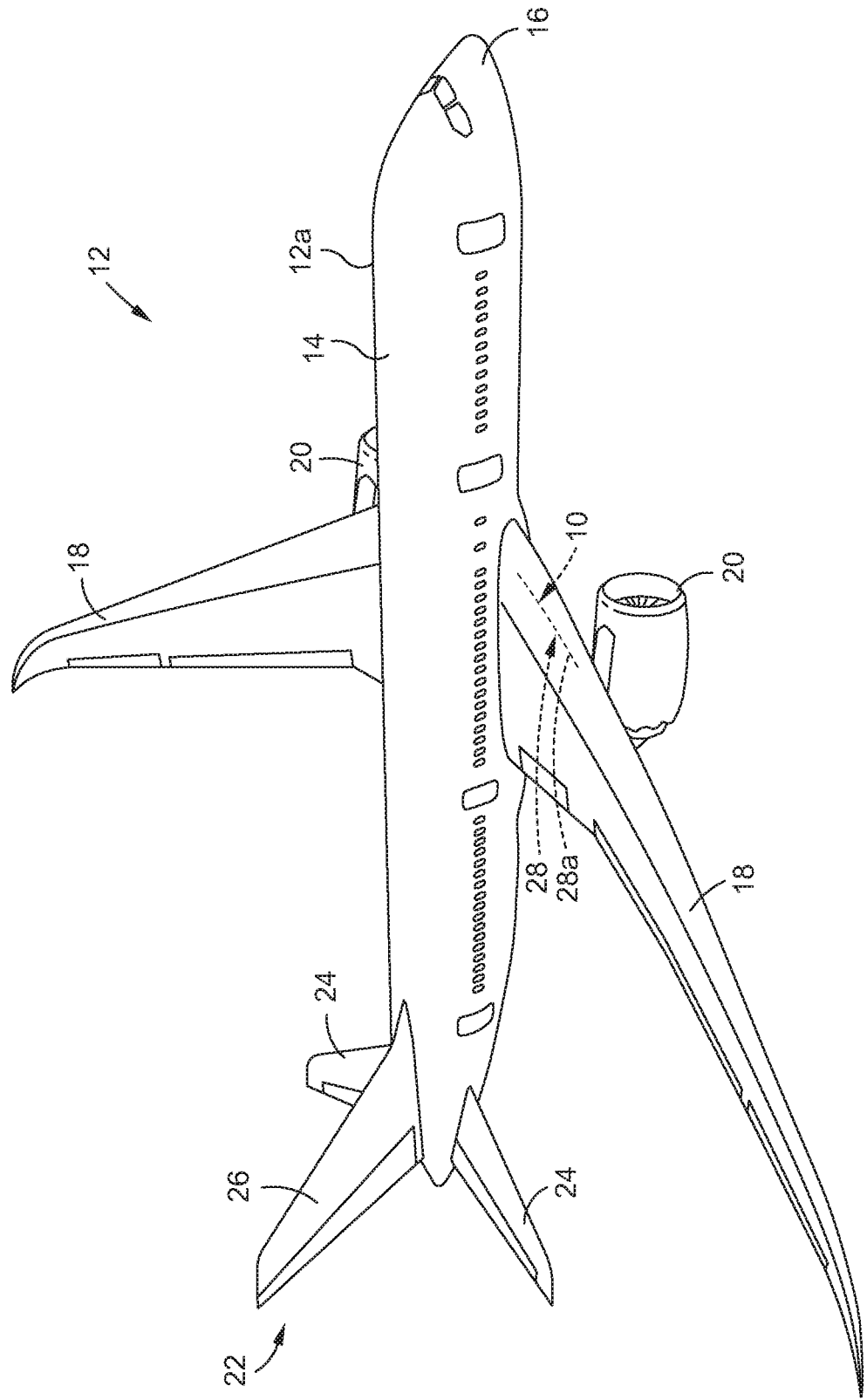
FIG. 1 is an illustration of a perspective view of an aircraft that incorporates one or more versions of a laminated composite structure of the disclosure.

Now referring to the Figures, FIG. 1 is an illustration of a perspective view of a vehicle 12, such as in the form of an aircraft 12a, that incorporates one or more versions of a laminated composite structure 10, of the disclosure. As further shown in FIG. 1, the vehicle 12, such as in the form of aircraft 12a, comprises a fuselage 14, a nose 16, wings 18, engines 20, and an empennage 22 comprising horizontal stabilizers 24 and a vertical stabilizer 26.

The laminated composite structure 10 (see FIGS. 1, 6A-6D, 8C, 9) has one or more interlaminar corrugations 100 (see FIGS. 6A-6D, 8C, 9). The laminated composite structure 10 (see FIG. 1, 6A-6D, 8C, 9) with the one or more interlaminar corrugations 100 (see FIGS. 6A-6D, 8C, 9) may be in the form of a laminated composite finished part 28 (see FIGS. 1, 9), such as a laminated composite blade stringer 28a (see FIGS. 1, 9) having an exposed edge 80 (see FIGS. 6A-6D, 9). The laminated composite structure 10 (see FIGS. 1, 8C, 9) with the one or more interlaminar corrugations 100 (see FIGS. 6A-6D, 8C, 9) may also comprise a laminated composite skin panel 28b (see FIG. 9), a laminated composite spar 28c (see FIG. 9), a laminated composite flight control surface 28d (see FIG. 9), a laminated composite test coupon 11 (see FIG. 9), or another suitable laminated composite structure having an exposed edge. Although FIG. 1 shows the laminated composite structure 10 used in a vehicle 12, such as an aircraft 12a, the laminated composite structure 10 may also be formed and used in other vehicles, such as rotorcraft, watercraft, automobiles, or another suitable vehicle or structure having a laminated composite structure with an exposed edge.

Figure 2:
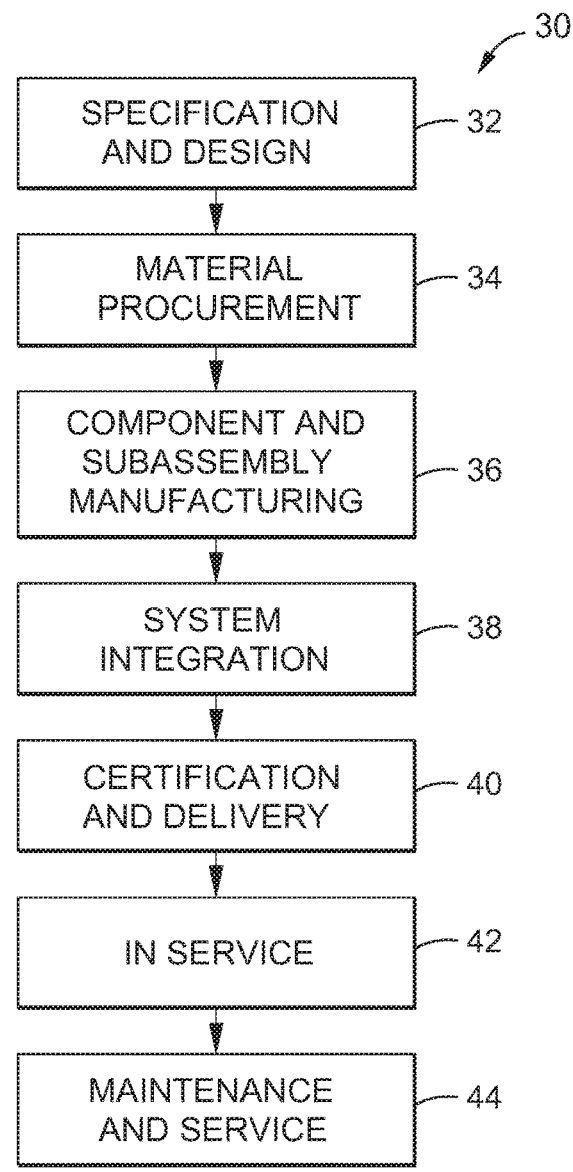
FIG. 2 is an illustration of a flow diagram of a version of an aircraft manufacturing and service method.
Figure 3:
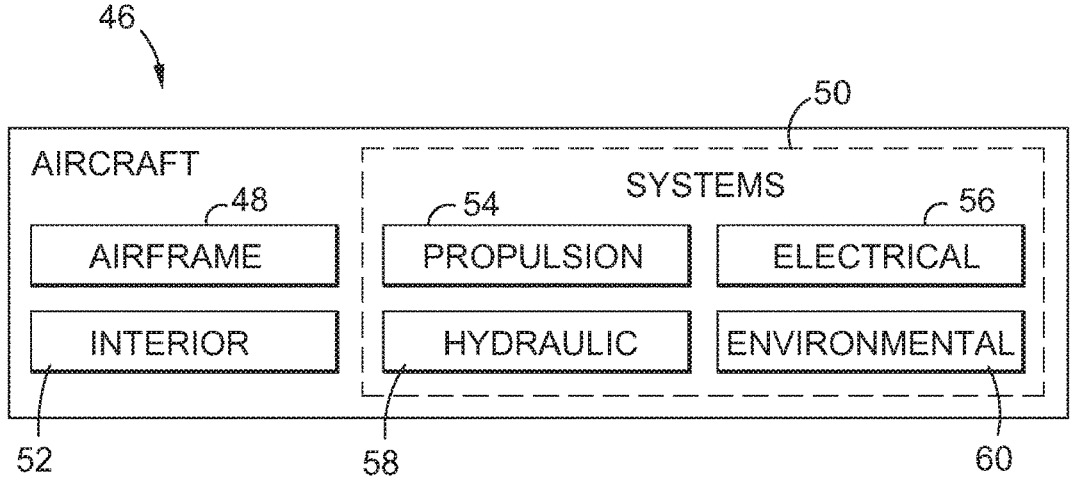
FIG. 3 is an illustration of a functional block diagram of a version of an aircraft.

Referring now to FIGS. 2 and 3, FIG. 2 is an illustration of a flow diagram of an embodiment of an aircraft manufacturing and service method 30. FIG. 3 is an illustration of a functional block diagram of an embodiment of an aircraft 46. Referring to FIGS. 2-3, embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 (see FIG. 2) may include an airframe 48 with a plurality of systems 50 and an interior 52. As further shown in FIG. 3, examples of the systems 50 may include one or more of a propulsion system 54, an electrical system 56, a hydraulic system 58, and an environmental system 60. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of, or reducing the cost of, the aircraft 46 (see FIG. 3). Similarly, one or more of the apparatus versions or embodiments, the method versions or embodiments, or a combination thereof, may be utilized while the aircraft 46 (see FIG. 3) is in service 42 (see FIG. 2), for example, and without limitation to, maintenance and service 44 (see FIG. 2).

Figure 4A:
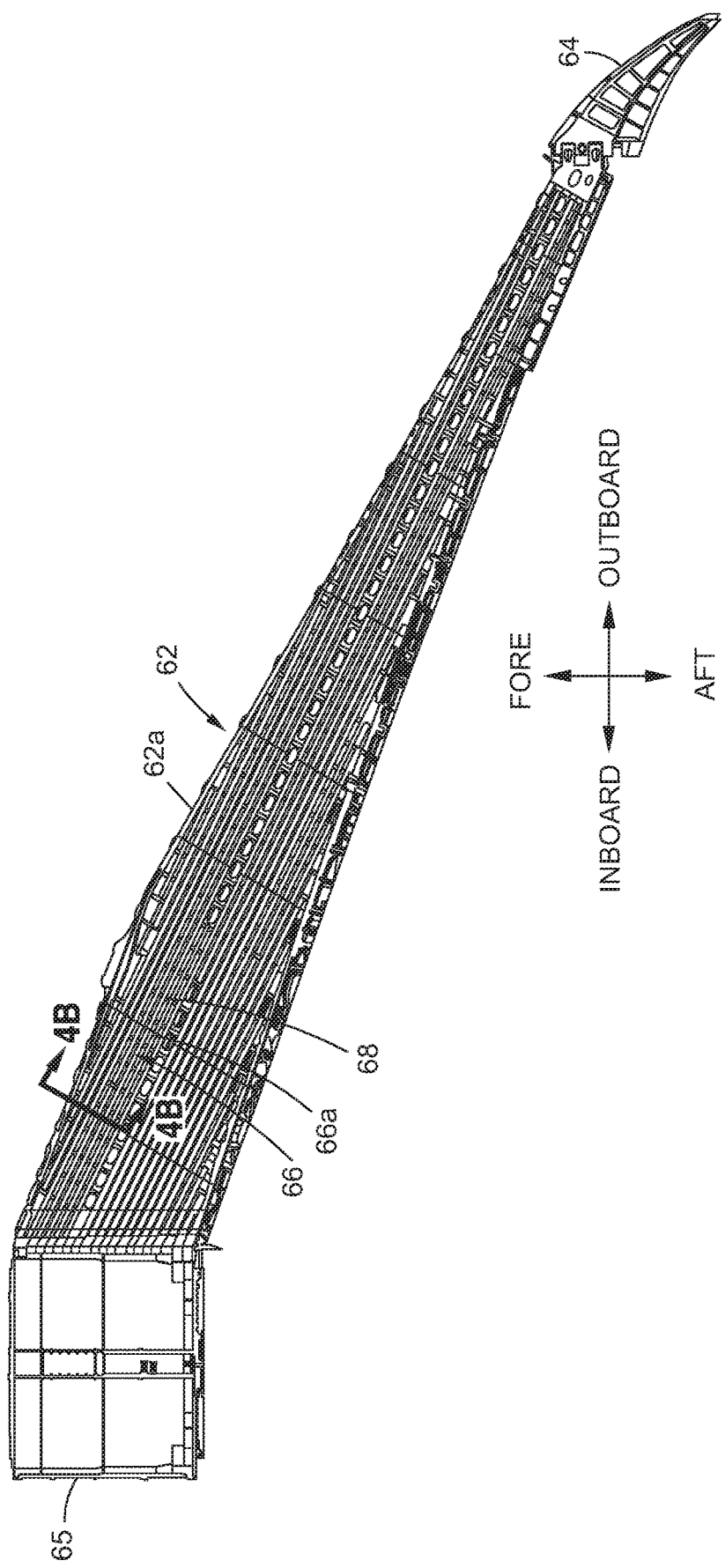
FIG. 4A is an illustration of a bottom view of a known aircraft wing panel showing a plurality of stringers.

Now referring to FIG. 4A, FIG. 4A is an illustration of a bottom view of a known aircraft wing panel 62, such as an aircraft composite wing panel 62a, showing fore, aft, inboard, and outboard directions. The known aircraft composite wing panel 62a (see FIG. 4A) is attached to a wingtip 64 (see FIG. 4A) at an outboard end, and is attached to a center wingbox 65 (see FIG. 4A) at an inboard end. The known aircraft composite wing panel 62a (see FIG. 4A) is typically reinforced with a plurality of stringers 66 (see FIG. 4A), including blade stringers 66a (see FIG. 4A). FIG. 4A shows a lower side 68 of the plurality of stringers 66 with a skin panel 70 (see FIG. 4B) removed.

Figure 4B:
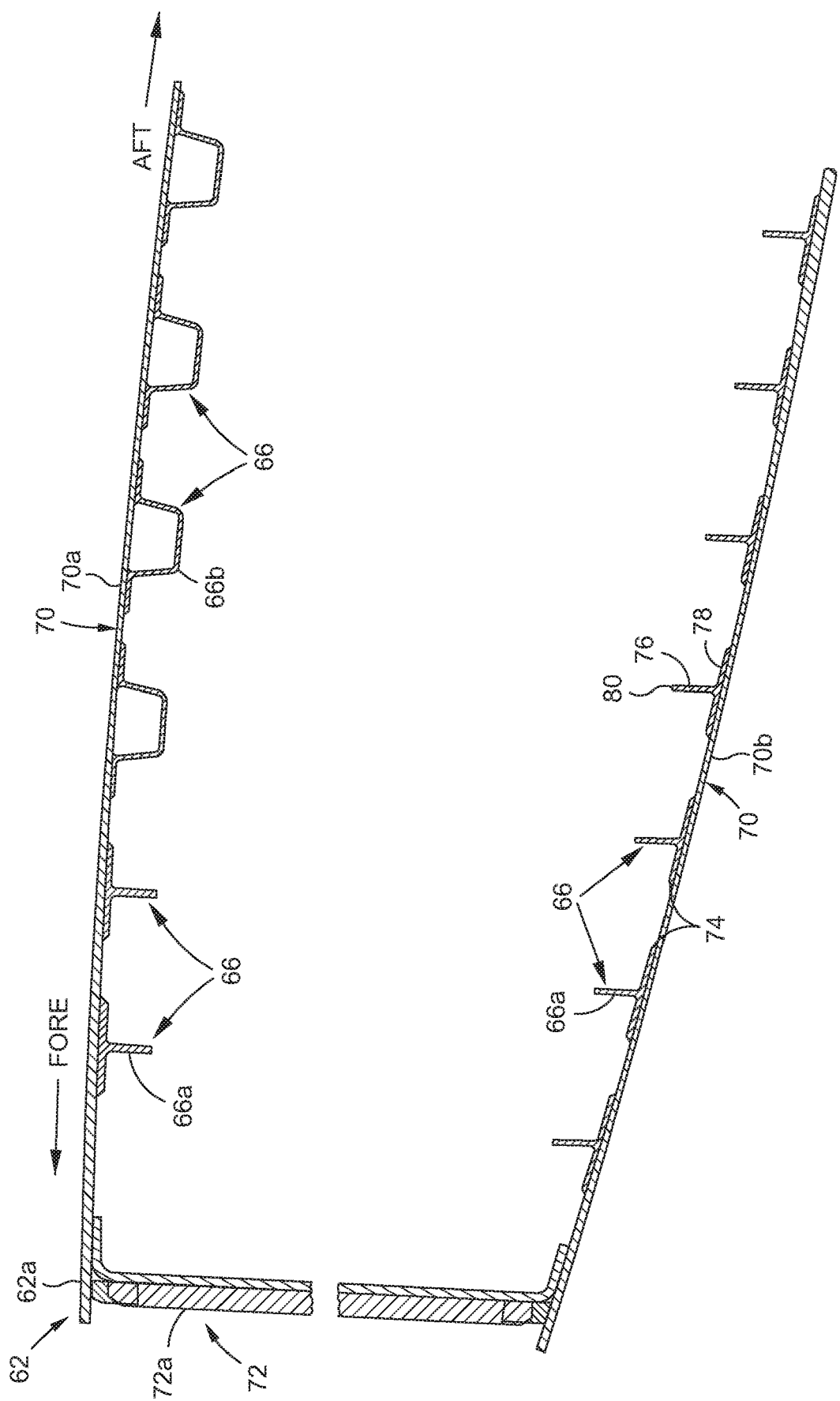
FIG. 4B is an enlarged cross-sectional view of the known aircraft wing panel of FIG. 4A, taken along lines 4B-4B of FIG. 4A.

FIG. 4B is an enlarged cross-sectional view of the known aircraft wing panel 62, such as the aircraft composite wing panel 62a, of FIG. 4A, taken along lines 4B-4B of FIG. 4A. FIG. 4B shows the fore and aft directions, and a spar 72, such as a front spar 72a. FIG. 4B further shows the plurality of stringers 66, including blade stringers 66a and hat stringers 66b, each attached to a skin panel 70, such as an upper skin panel 70a, or a lower skin panel 70b, at interior attachment locations 74. As shown in FIG. 4B, each blade stringer 66a typically includes a web 76 and a base 78, where the base 78 is attached to the skin panel 70 at the interior attachment location 74, and where the web 76 has an exposed edge 80.

FIG. 5A is an illustration of a cross-sectional view of a known blade stringer 66a, attached to a skin panel 70, and showing impact forces 88 from an object (not shown) or objects (not shown) made at an impact location 90, such as an exposed edge 80, of the web 76. As shown in FIG. 5A, the impact force 88 may include one impact force 88a perpendicular to the exposed edge 80 of the web 76, and/or may include another impact force 88b at an angle to the exposed edge 80 of the web 76. The impact forces 88 shown in FIG. 5A are merely exemplary and are not limited to those shown. FIG. 5A shows the known blade stringer 66a comprising the web 76, including the first web portion 76a and the second web portion 76b, the base 78, including flanges 82 and a lower base portion 84, and a filler portion 86. The flanges 82 (see FIG. 5A) include a first flange portion 82a (see FIG. 5A) and a second flange portion 82b (see FIG. 5A). The first web portion 76a, the second web portion 76b, and the base 78 are typically formed from a plurality of stacked ply layers 92. The impact force 88 (see FIG. 5A), such as impact forces 88a, 88b (see FIG. 5A), to the web 76 (see FIG. 5A) at the impact location 90 (see FIG. 5A) may cause delamination or fiber breakage between the plurality of stacked ply layers 92 (see FIG. 5A) of the first web portion 76a and the second web portion 76b, which may reduce the structural capability of the known blade stringer 66a. Such delamination or fiber breakage may be difficult to detect.

FIG. 5B is an illustration of a perspective view of a known blade stringer 66a, showing an impact damage area 94 to the web 76. As shown in FIG. 5B, the impact damage area 94, such as from impact force 88 (see FIG. 5A), for example, impact forces 88a, 88b (see FIG. 5A), may be extensive, such as shown by a length 96 and a depth 98 of the impact damage area 94, but may not be visible. If the damaged known blade stringer 66a (see FIG. 5B) is subjected to compression forces applied inwardly against each end of the web 76, the impact damage area 94 may buckle, separating the plurality of stacked ply layers 92 (see FIG. 5A) of the first web portion 76a (see FIG. 5A) and the second web portion 76b (see FIG. 5A), and may further reduce the structural capability of the known blade stringer 66a (see FIG. 5A). FIG. 5B further shows the web 76 and the base 78 of the known blade stringer 66a, and shows the known blade stringer 66a attached to the skin panel 70.

Figure 6A:
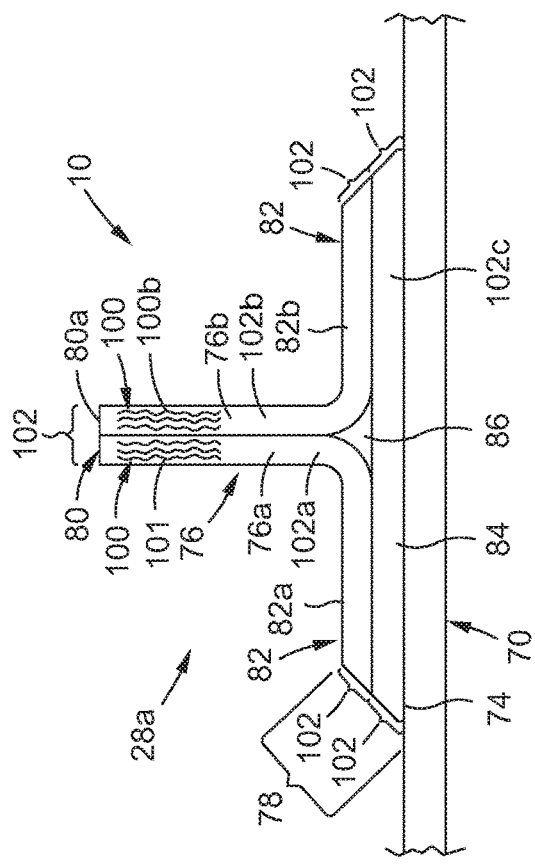
FIG. 6A is an illustration of a cross-sectional view of a laminated composite structure, in the form of a laminated composite blade stringer, with a version of the interlaminar corrugations of the disclosure.
Figure 6B:
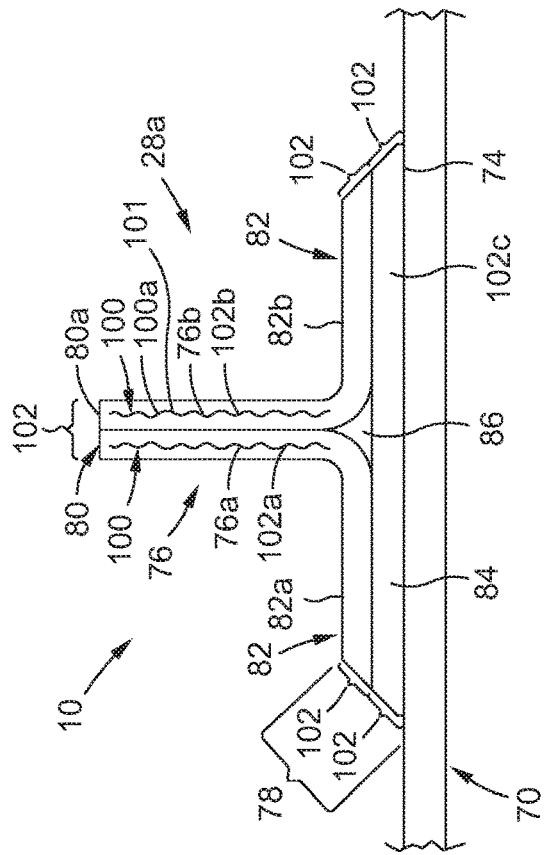
FIG. 6B is an illustration of a cross-sectional view of a laminated composite structure, in the form of a laminated composite blade stringer, with another version of the interlaminar corrugations of the disclosure.
Figure 6C:
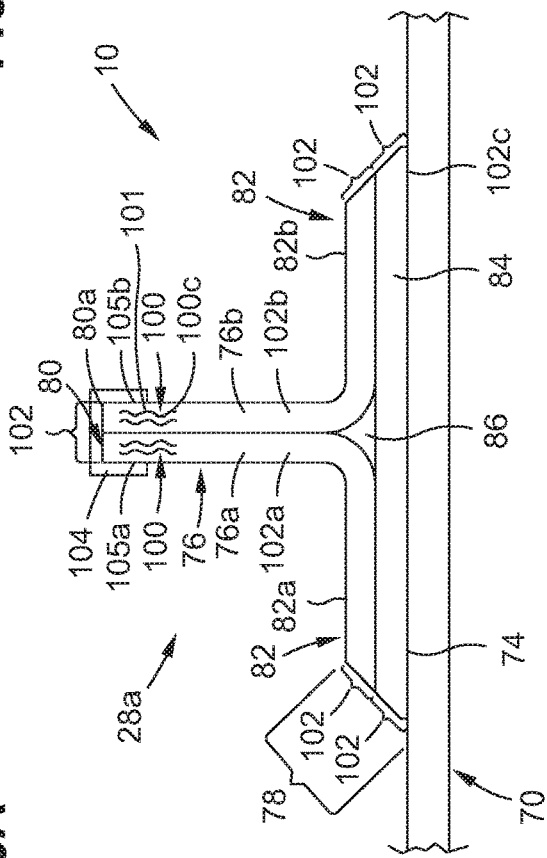
FIG. 6C is an illustration of a cross-sectional view of a laminated composite structure, in the form of a laminated composite blade stringer, with yet another version of the interlaminar corrugations of the disclosure, and with an edge covering.
Figure 6D:
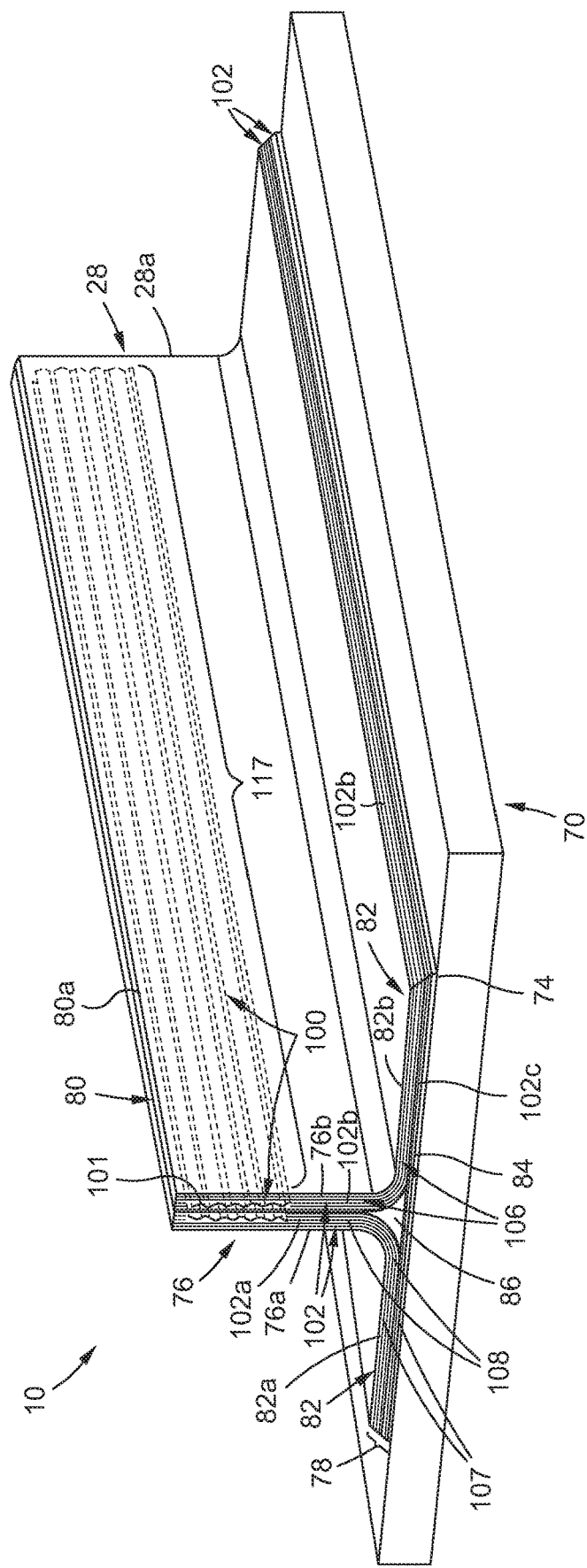
FIG. 6D is an illustration of a perspective view of a version of a laminated composite structure, in the form of a laminated composite blade stringer, showing a width of the interlaminar corrugations of the disclosure.

Now referring to FIGS. 6A-6D, FIG. 6A is an illustration of a cross-sectional view of a laminated composite structure 10, such as in the form of a laminated composite blade stringer 28a, with one version of the interlaminar corrugations 100 of the disclosure. FIG. 6B is an illustration of a cross-sectional view of a laminated composite structure 10, in the form of a laminated composite blade stringer 28a, with another version of the interlaminar corrugations 100 of the disclosure. FIG. 6C is an illustration of a cross-sectional view of a laminated composite structure 10, in the form of a laminated composite blade stringer 28a, with yet another version of the interlaminar corrugations 100 of the disclosure, and with an edge covering 104. FIG. 6D is an illustration of a perspective view of a version of a laminated composite structure 10, in the form of a laminated composite finished part 28, such as a laminated composite blade stringer 28a, with the interlaminar corrugations 100.

FIGS. 6A-6D show the laminated composite structure 10, such as in the form of a laminated composite blade stringer 28a, comprising the web 76, including the first web portion 76a and the second web portion 76b, the base 78, including flanges 82 and a lower base portion 84, and a filler portion 86. FIGS. 6A-6D further show the web 76 having an exposed edge 80, such as an exposed vertical outer edge 80a. FIGS. 6A-6D further show the flanges 82 comprising the first flange portion 82a and the second flange portion 82b, and show the lower base portion 84 of the base 78 attached at an interior attachment location 74 to the skin panel 70.

As shown in FIGS. 6A-6D, the first web portion 76a and the first flange portion 82a comprise, and are preferably formed from, a plurality of stacked layers 102, or plies, such as a first plurality of stacked layers 102a. As further shown in FIGS. 6A-6D, the second web portion 76b and the second flange portion 82b comprise, and are preferably formed from, a plurality of stacked layers 102, or plies, such as a second plurality of stacked layers 102b. As further shown in FIGS. 6A-6D, the lower base portion 84 comprises, and is preferably formed from, a plurality of stacked layers 102, or plies, such as a third plurality of stacked layers 102c.

The plurality of stacked layers 102 (see FIGS. 6A-6D), or plies, are preferably comprised of a composite material 106 (see FIG. 6D). The composite material 106 (see FIG. 6D) comprises a resin material 108 (see FIG. 6D), or polymer matrix, reinforced with a fiber material 107 (see FIG. 6D). As shown in FIGS. 6A-6D, the plurality of stacked layers 102, or plies, have one or more interlaminar corrugations 100 formed within the plurality of stacked layers 102, or plies. Each interlaminar corrugation 100 (see FIGS. 6A-6D) has a substantially sinusoidal shaped profile 101 (see FIGS. 6A-6D). Each interlaminar corrugation 100 (see FIGS. 6A-6D) further has a depth 114 (see FIGS. 7, 9), a length 116 (see FIGS. 7, 9), and a width 117 (see FIGS. 6D, 9), discussed in more detail below, that are dependent on a size 103 (see FIG. 9) of the laminated composite structure 10 (see FIGS. 6A-6D) that is formed. The laminated composite structure 10 (see FIGS. 6A-6D) with the one or more interlaminar corrugations 100 (see FIGS. 6A-6D) preferably has improved strength 202 (see FIG. 9) and improved impact damage resistance 200 (see FIG. 9) at the exposed edge 80 (see FIGS. 6A-6D), such as at the exposed vertical outer edge 80a (see FIGS. 6A-6D), of the web 76 (see FIGS. 6A-6D), when the exposed edge 80, such as at the exposed vertical outer edge 80a, is subjected to one or more impact forces 88 (see FIG. 9), for example, impact forces 88a, 88b (see FIG. 5A), from an object or objects (not shown).

As shown in FIG. 6A, in one version, the interlaminar corrugations 100 formed in the web 76 of the laminated composite structure 10, such as the laminated composite blade stringer 28a, may comprise large interlaminar corrugations 100a. Such large interlaminar corrugations 100a (see FIG. 6A) preferably extend vertically along substantially an entire length of the web 76 (see FIG. 6A), such as including the first web portion 76a (see FIG. 6A) and the second web portion 76b (see FIG. 6A).

As shown in FIG. 6B, in another version, the interlaminar corrugations 100 formed in the web 76 of the laminated composite structure 10, such as the laminated composite blade stringer 28a, may comprise medium interlaminar corrugations 100b. Such medium interlaminar corrugations 100b (see FIG. 6B) preferably extend vertically along about half the length of the web 76 (see FIG. 6B), such as including the first web portion 76a (see FIG. 6B) and the second web portion 76b (see FIG. 6B).

As shown in FIG. 6C, in yet another version, the interlaminar corrugations 100 formed in the web 76 of the laminated composite structure 10, such as the laminated composite blade stringer 28a, may comprise small interlaminar corrugations 100c. Such small interlaminar corrugations 100c preferably extend vertically along about one-quarter to about one-third the length of the web 76 (see FIG. 6C), such as including the first web portion 76a (see FIG. 6C) and the second web portion 76b (see FIG. 6C). As further shown in FIG. 6C, optionally, an edge covering 104 may be used, along with the interlaminar corrugations 100, to provide additional protection to the exposed edge 80 of the web 76 by additionally absorbing and distributing the impact force 88 (see FIG. 9), or impact forces 88, and by additionally inhibiting separation of or damage to the plurality of stacked layers 102 of the laminated composite blade stringer 28a.

As shown in FIG. 6D, the width 117 of each interlaminar corrugation 100 extends along the width of the web 76 and extends parallel to the exposed edge 80 of the web 76. The one or more interlaminar corrugations 100 (see FIG. 6D) are preferably transverse to the web 76 (see FIG. 6D) of the laminated composite blade stringer 28a (see FIG. 6D).

Figure 7:
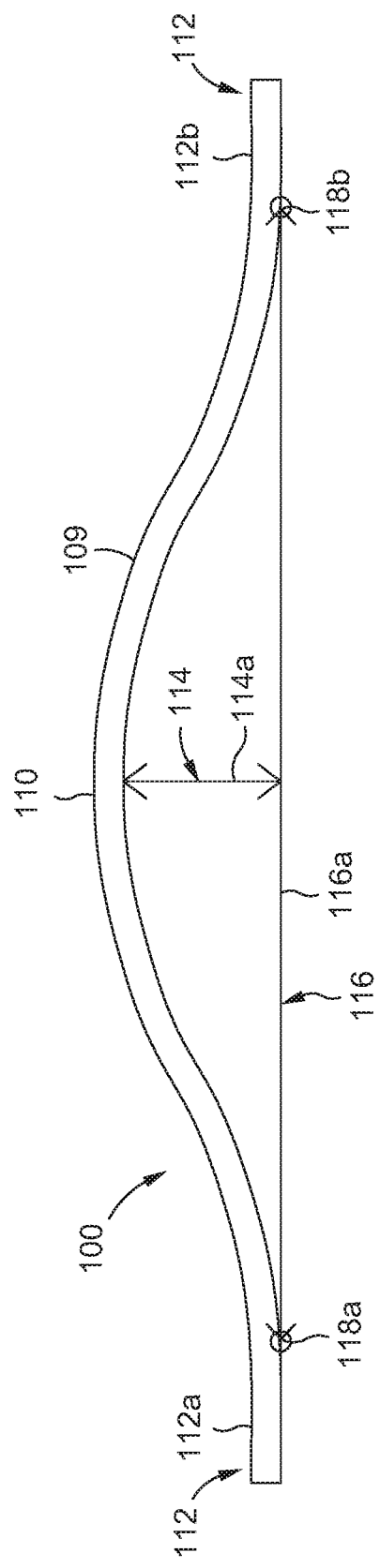
FIG. 7 is a schematic diagram of an enlarged cross-section of a peak and valley segment of an interlaminar corrugation showing a depth and a length.

Now referring to FIG. 7, FIG. 7 is a schematic diagram of an enlarged cross-section of a peak and valley segment 109 of an interlaminar corrugation 100 showing a depth 114 and a length 116 of the interlaminar corrugation 100. Each interlaminar corrugation 100 (see FIGS. 6A-6D, 7) comprises multiple peak and valley segments 109 (see FIG. 7) comprised of alternating peaks 110 (see FIG. 7) and valleys 112 (see FIG. 7). As shown in FIG. 7, each peak and valley segment 109 of the interlaminar corrugation 100 comprises a peak 110 and valleys 112, such as a first valley portion 112a and a second valley portion 112b. The depth 114 (see FIG. 7) preferably comprises a peak height 114a (see FIG. 7) of the peak 110 (see FIG. 7). The depth 114 (see FIG. 7) of each interlaminar corrugation 100 (see FIG. 7) is preferably in a range of from 0.01 inch to 0.35 inch. For example, a large interlaminar corrugation 100a (see FIG. 6A) may have a depth 114 (see FIG. 7) in a range of 0.025 inch to 0.035 inch, and a small interlaminar corrugation 100c (see FIG. 6C) may have a depth 114 in a range of 0.01 inch to 0.024 inch. The depth 114 (see FIG. 7) of the interlaminar corrugation 100 (see FIG. 7) is preferably tracked at a center fabric or ply, or at a 90 degree ply, of the plurality of stacked layers 102 (see FIG. 6D) or plies.

As shown in FIG. 7, the length 116 of each interlaminar corrugation 100 preferably comprises a distortion length 116a measured between a first tangent point 118a of the first valley portion 112a and a second tangent point 118b of the second valley portion 112b, where the peak 110 is formed between the first valley portion 112a and the second valley portion 112b. The length 116 (see FIG. 7) of each interlaminar corrugation 100 (see FIG. 7) is preferably in a range of from 0.20 inch to 0.60 inch. The length 116 (see FIG. 7) of each interlaminar corrugation 100 (see FIG. 7) is more preferably in a range of from 0.35 inch to 0.55 inch. However, the length 116 may vary depending on the composite material 106 system used.

Figure 9:
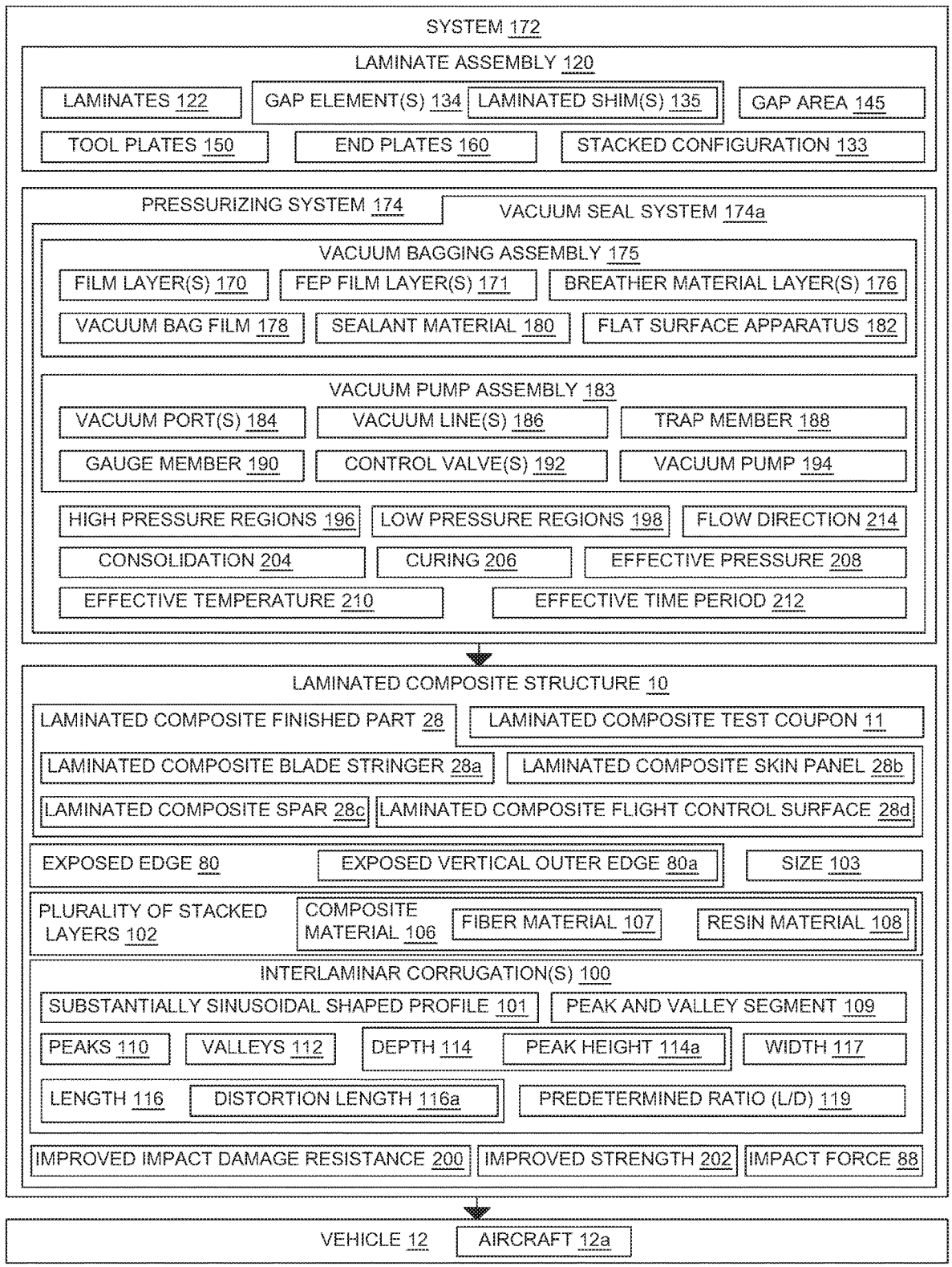
FIG. 9 is an illustration of a functional block diagram showing exemplary versions of a system for forming a laminated composite structure with interlaminar corrugations, and formed laminated composite structures with interlaminar corrugations of the disclosure.

Each interlaminar corrugation 100 (see FIGS. 7, 9) further has a predetermined ratio (L/D) 119 (see FIG. 9) of the length 116 (see FIGS. 7, 9) to the depth 114 (see FIGS. 7, 9). Each interlaminar corrugation 100 (see FIGS. 6D, 9) further has a width 117 (see FIGS. 6D, 9).

Figure 8A:
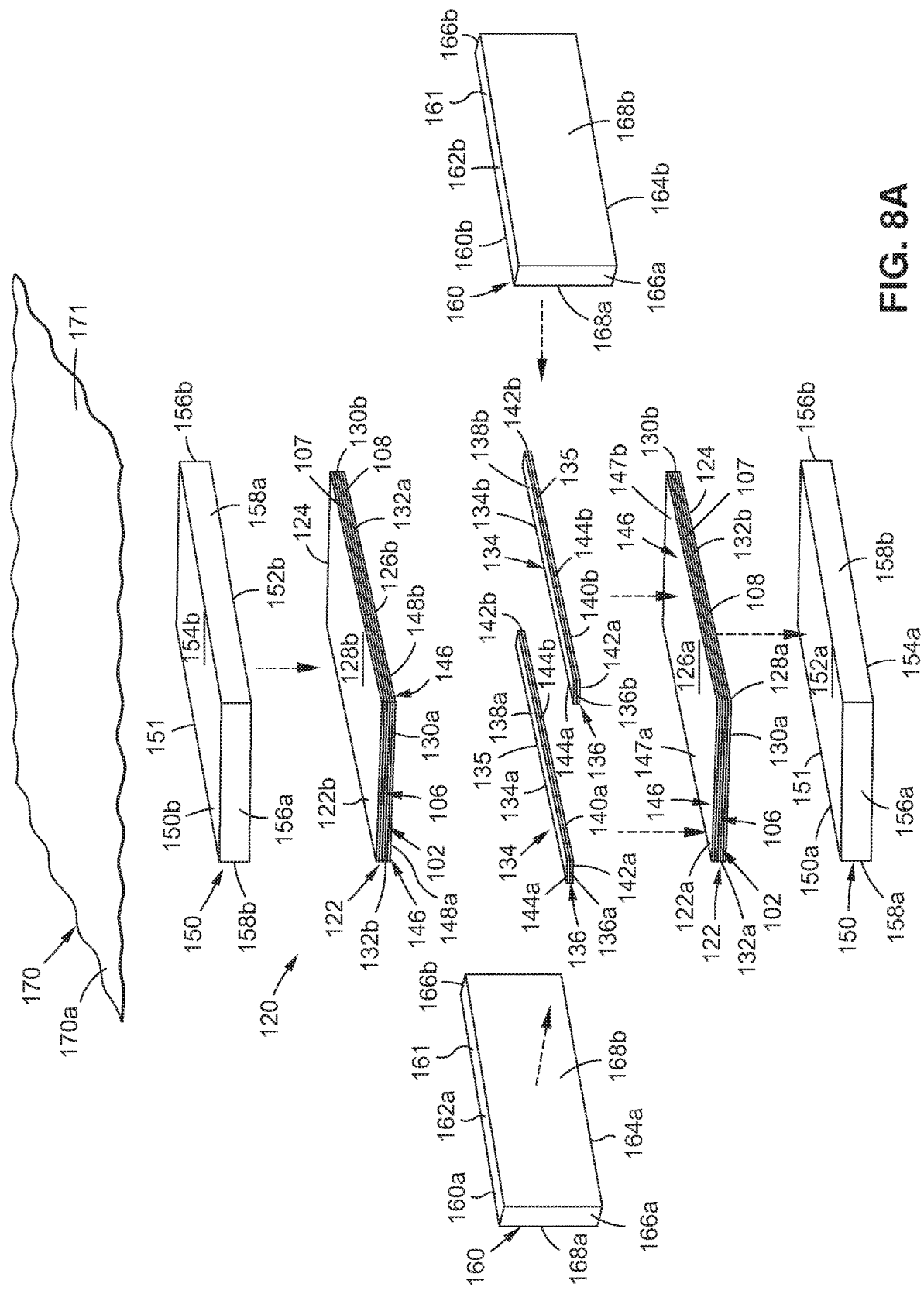
FIG. 8A is an exploded perspective view of a version of a laminate assembly, end plates, and film layer that may be used in a system for forming a laminated composite structure with interlaminar corrugations of the disclosure.
Figure 8B:
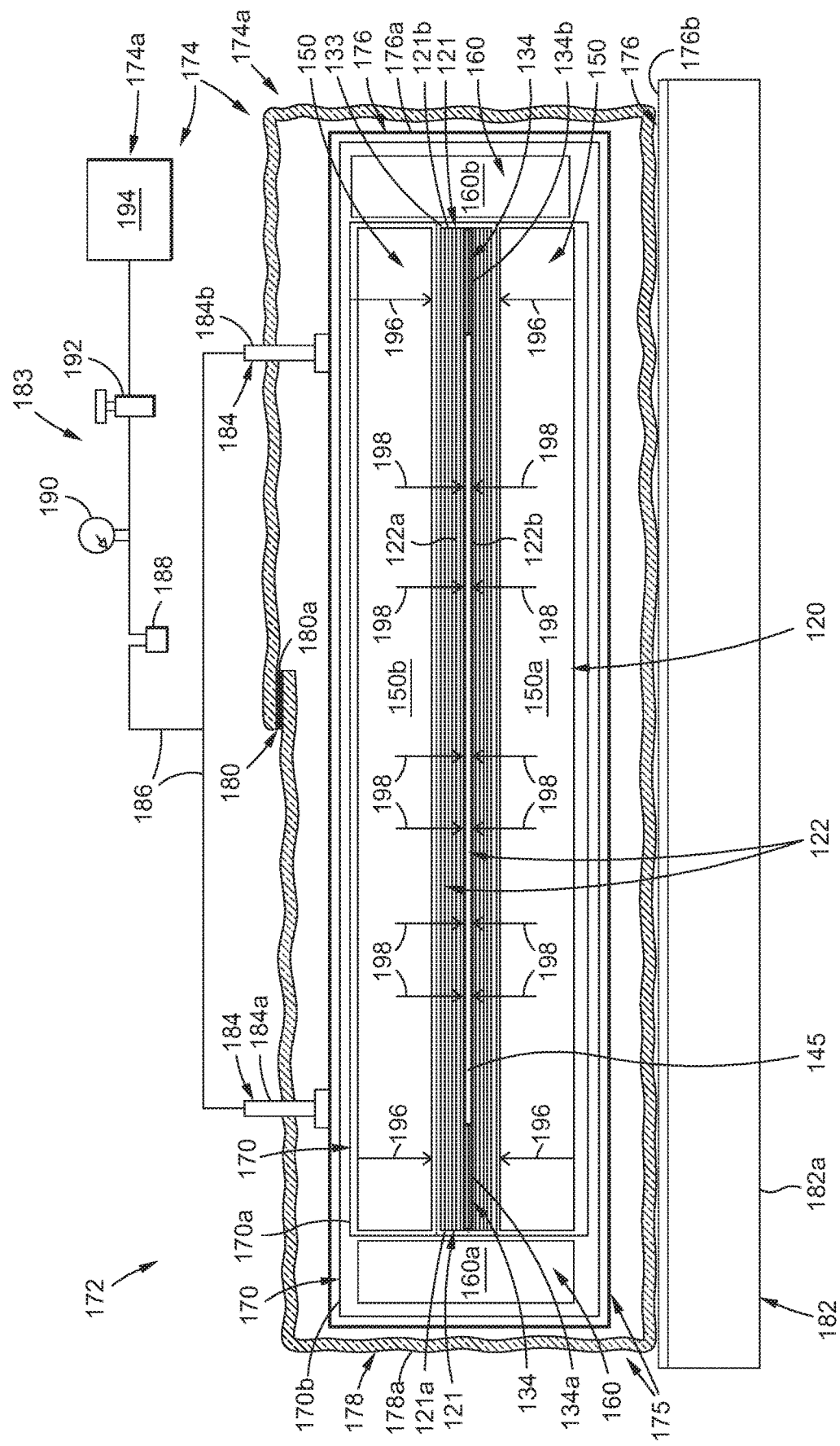
FIG. 8B is a schematic diagram of a front partial sectional view of a system for forming a laminated composite structure with interlaminar corrugations of the disclosure.
Figure 8C:
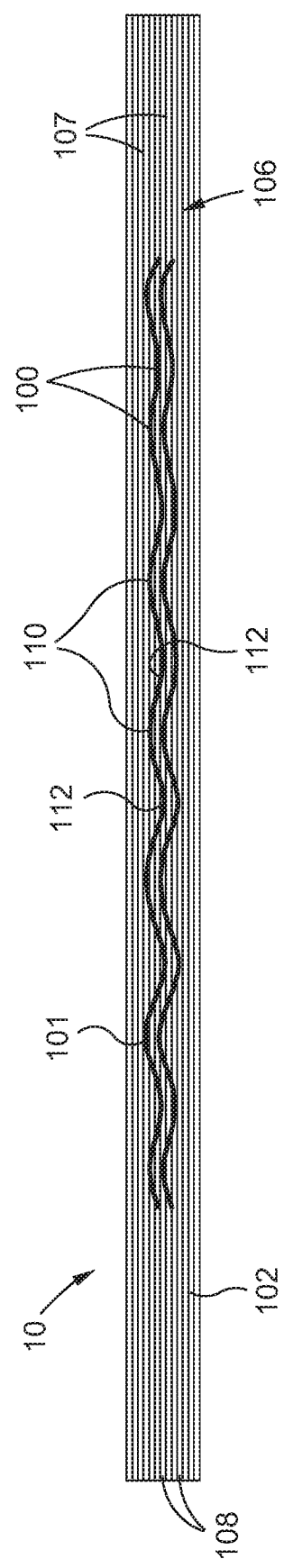
FIG. 8C is a schematic diagram of a front sectional view of a formed laminated composite structure with interlaminar corrugations of the disclosure.

Now referring to FIGS. 8A-8C, FIG. 8A is an exploded perspective view of a version of a laminate assembly 120, end plates 160, and a film layer 170 that may be used in a system 172 (see FIGS. 8B, 9) for forming a laminated composite structure 10 (see FIGS. 6A-6D, 8C, 9) with interlaminar corrugations 100 (see FIGS. 6A-6D, 8C, 9) of the disclosure. FIG. 8B is a schematic diagram of a front partial sectional view of the system 172 for forming the laminated composite structure 10 with interlaminar corrugations 100 of the disclosure. FIG. 8C is a schematic diagram of a front sectional view of a formed laminated composite structure 10 with interlaminar corrugations 100 of the disclosure, formed using the system 172 (see FIG. 8B).

As shown in FIGS. 8A-8B, in one version, the system 172 (see FIG. 8B) comprises a laminate assembly 120 with laminates 122, such as in the form of a first laminate 122a coupled to, or configured to be coupled to, a second laminate 122b. The first laminate 122a (see FIGS. 8A-8B) and the second laminate 122b (see FIGS. 8A-8B) may each preferably comprise a laminate half 124 of a total thickness of the finished or formed laminated composite structure 10 (see FIGS. 6A-6D, 8C, 9), for example, a laminated composite test coupon 11 (see FIG. 9), or a laminated composite finished part 28 (see FIG. 9).

As shown in FIG. 8A, the first laminate 122a comprises a first side 126a and a second side 128a, and the second laminate 122b comprises a first side 126b and a second side 128b. When coupled together, preferably, the first side 126a of the first laminate 122a is coupled to the first side 126b of the second laminate 122b. The laminates 122 may also be coupled on different sides or in a different manner, as long as a gap area 145 (see FIG. 8B), or volume, is formed between the laminates 122 coupled together.

As further shown in FIG. 8A, the laminates 122, such as the first laminate 122a and the second laminate 122b, each comprise a first end 130a, a second end 130b, a first side end 132a, and a second side end 132b. When the laminates 122 are used to form a laminated composite test coupon 11 (see FIG. 9), laminates 122 for multiple laminated composite test coupons 11 may be combined or nested into one large laminate and subsequently trimmed, for example, with an ultrasonic knife or another suitable cutting or trimming device, to improve efficiency. As shown in FIG. 8B, when coupled together, the first laminate 122a and the second laminate 122b are preferably in a stacked configuration 133.

Each laminate 122 (see FIG. 8A) comprises a plurality of stacked layers 102 (see FIG. 8A), or plies. The stacked layers 102 (see FIGS. 8A, 8C, 9), or plies, each preferably comprises one or more composite materials 106 (see FIGS. 8A, 8C, 9). The composite material 106 (see FIGS. 8A, 8C, 9) preferably comprises a resin material 108 (see FIGS. 8A, 8C, 9), or polymer matrix, reinforced with a fiber material 107 (see FIGS. 8A, 8C, 9).

The fiber material 107 (see FIGS. 8A, 8C, 9) preferably comprises fibers or fabric. Exemplary fiber material 107 may include carbon fibers, glass fibers, fiberglass, aramids, polymer fibers, synthetic polymer fibers, polypropylene (PP) fibers, nylon fibers, woven fabric, nonwoven fabric, a combination or one or more thereof, or other suitable fibers or fabrics.

The resin material 108 (see FIGS. 8A, 8C, 9) preferably comprises a resin matrix material or a polymer matrix material. Exemplary resin materials 108 may include thermoset resin materials comprising one or more of, polyesters, polyurethanes, phenols, epoxies, bismaleimides (BMI), and a combination of one or more thereof, or another suitable thermoset resin; or the exemplary resin materials 108 may include thermoplastic resin materials comprising one or more of, polyurethane, polypropylene (PP), polyethylene (PE), polyethylene terephthalate (PET), polytrimethylene terephthalate (PTT), polyamide (PA), polyetherimide (PEI), polyvinyl chloride (PVC), polyetheretherketone (PEEK), polyetherketoneketone (PEKK), polyphenylene sulfide (PPS), polycarbonate, nylon, acrylic, rubber, a combination thereof, or another suitable thermoplastic resin.

The composite material 106 comprising the resin material 108 reinforced with the fiber material 107 preferably comprises a resin or polymer matrix reinforced with fibers or fabric. Exemplary composite materials 106, or composite material systems, may include one or more of, fiber reinforced plastics, carbon fiber reinforced plastics (CFRP), thermoplastic composite materials, bismaleimide (BMI) prepregs, carbon fiber reinforced polyetheretherketone (PEEK), carbon fiber reinforced polyetherketoneketone (PEKK), carbon fiber reinforced polyethyleneimine (PEI), polyethylene terephthalate (PET), polytrimethylene terephthalate (PTT), polypropylene (PP), polyethylene (PE), polyamide (PA), polyphenylene sulfide (PPS), aramids, co-polyesters, fiberglass, ceramics, nonwoven fabric material, woven fabric material, a combination of one or more thereof, or another suitable composite material.

As shown in FIGS. 8A-8B, the system 172 (see FIG. 8B) may further comprise tool plates 150, such as in the form of a first tool plate 150a and a second tool plate 150b. Preferably, the tool plates 150 comprise caul plates 151 (see FIG. 8A), or another suitable tool or mold structure. The tool plates 150 (see FIG. 8A) may be made of steel or another suitable metal material, a ceramic material, a composite material, or other materials designed for consolidation and curing processes to form laminated composite structures.

As shown in FIG. 8A, the first tool plate 150a comprises a first side 152a and a second side 154a, and the second tool plate 150b comprises a first side 152b and a second side 154b. Preferably, the second side 128a (see FIG. 8A) of the first laminate 122a (see FIG. 8A) is coupled to the first side 152a (see FIG. 8A) of the first tool plate 150a (see FIG. 8A), and preferably, the second side 128b (see FIG. 8A) of the second laminate 122b (see FIG. 8A) is coupled to the first side 152b (see FIG. 8A) of the second tool plate 150b (see FIG. 8A). However, the laminates 122 (see FIGS. 8A-8B) may be coupled to the respective tool plates 150 (see FIGS. 8A-8B) on different sides of the tool plates 150, or in a different manner, as long as the gap area 145 (see FIG. 8B), or volume, is still formed between the coupled laminates 122.

As shown in FIG. 8A, the tool plates 150, such as the first tool plate 150a and the second tool plate 150b, each comprise a first end 156a, a second end 156b, a first side end 158a, and a second side end 158b. As shown in FIG. 8B, when the first laminate 122a and the second laminate 122b are coupled to each other in the stacked configuration 133, the first tool plate 150a and the second tool plate 150b, with the laminates 122 positioned between the tool plates 150, are also in the stacked configuration 133.

Each tool plate 150 (see FIG. 8A) has a suitable width, length, and thickness dependent on the size of the laminates 122 (see FIG. 8A) used. For example, the tool plate 150 (see FIG. 8A) may have a width of about 7 inches, a length of about 24 inches, and a thickness of about 0.5 inch. However, the tool plate 150 may have another suitable width, length, and thickness. When each laminate 122 is coupled to the respective tool plate 150, each laminate is preferably aligned onto each tool plate 150 and aligned flush to the edges of the tool plate 150 on at least one side of the tool plate 150. The opposite side of the laminate 122 is preferably trimmed, as necessary, to align flush to the opposite edge of the tool plate 150, so that the laminate 122 is preferably flush to the edges of the tool plate on both sides. After the laminate 122 is coupled to the tool plate 150 and trimmed, as necessary, the length and width of the laminate 122 is preferably the same, or substantially the same, as the length and width of the tool plate 150 to which it is coupled or attached. For example, after coupling and trimming, the laminate 122 may have a width of about 7 inches and a length of about 24 inches, when the width of the tool plate 150 is about 7 inches and the length of the tool plate 150 is about 24 inches. The thickness of each laminate 122 is preferably less than the thickness of each tool plate 150 the laminate 122 is coupled to or attached.

As shown in FIGS. 8A-8B, the laminate assembly 120 of the system 172 (see FIG. 8B) further comprises one or more gap elements 134 coupled, or configured to be coupled, between the first laminate 122a and the second laminate 122b. The one or more gap elements 134 (see FIGS. 8A-8B) preferably comprise a first gap element 134a (see FIGS. 8A-8B) and a second gap element 134b (see FIGS. 8A-8B). Each gap element 134 (see FIGS. 8A-8B) preferably comprises a laminated shim 135 (see FIG. 8A), or another suitable spacer or gap forming element. Each gap element 134, such as in the form of laminated shim 135 (see FIG. 8A), may comprise a plurality of stacked layers 136 (see FIG. 8A), or plies. The first gap element 134a (see FIG. 8A), such as in the form of laminated shim 135 (see FIG. 8A), comprises a first plurality of stacked layers 136a (see FIG. 8A), and the second gap element 134b (see FIG. 8A), such as in the form of laminated shim 135, comprises a second plurality of stacked layers 136b (see FIG. 8A). For example, for forming a large interlaminar corrugation 100a (see FIG. 6A), the gap element 134, such as in the form of laminated shim 135, that may be used may comprise a 10-ply laminated shim or a 12-ply to 15-ply laminated shim, i.e., a stack of ten (10) plies or layers, or a stack of twelve (12) to fifteen (15) plies or layers. In addition, for example, for forming a small interlaminar corrugation 100c (see FIG. 6C), the gap element 134, such as in the form of laminated shim 135, that may be used may comprise a 5-ply laminated shim, i.e., a stack of five (5) plies or layers.

As shown in FIG. 8A, the first gap element 134a comprises a first side 138a and a second side 140a, and the second gap element 134b comprises a first side 138b and a second side 140b. As further shown in FIG. 8A, the gap elements 134, such as the first gap element 134a and the second gap element 134b, each comprise a first end 142a, a second end 142b, a first side end 144a, and a second side end 144b. The one or more gap elements 134 (see FIGS. 8A-8B) form, or are configured to form, a gap area 145 (see FIG. 8B), or volume of air space, between the first laminate 122a (see FIGS. 8A-8B) and the second laminate 122b (see FIGS. 8A-8B). This gap area 145 (see FIG. 8B) preferably creates a distance, such as a stand-off distance, between the laminates 122 (see FIG. 8B).

The one or more gap elements 134 (see FIG. 8A), such as in the form of laminated shims 135 (see FIG. 8A), may be comprised of one or more composite materials 106 (see FIG. 9). The composite material 106 (see FIG. 9) comprises a resin material 108 (see FIG. 9), or polymer matrix, reinforced with a fiber material 107 (see FIG. 9). For example, the one or more gap elements 134 (see FIG. 8A), such as in the form of laminated shims 135 (see FIG. 8A), may be comprised of multiple plies of zero degree (0°) unidirectional carbon fiber reinforced plastic (CFRP) tape, or another suitable composite material, as discussed above with regard to the laminates 122. Preferably, the gap elements 134, such as in the form of laminated shims 135, are the same or similar composite material or composite materials as the composite material 106 or composite materials forming the laminates 122, such as discussed above.

As shown in FIG. 8A, the one or more gap elements 134 (see FIG. 8A), such as in the form of laminated shims 135 (see FIG. 8A), are preferably coupled, or configured to be coupled to, one or more longitudinal edges 146 on the first side 126a (see FIG. 8A) of the laminate 122, such as the first laminate 122a. Preferably, the one or more gap elements 134 (see FIG. 8A), such as in the form of laminated shims 135 (see FIG. 8A), are each aligned flush along the respective longitudinal edges 146 of the laminate 122, such as the first laminate 122a. Once the one or more gap elements 134 (see FIG. 8A), such as in the form of laminated shims 135 (see FIG. 8A), are suitably positioned on the laminate 122, such as the first laminate 122a, the one or more gap elements 134 (see FIG. 8A), such as in the form of laminated shims 135 (see FIG. 8A), are coupled or attached, such as by vacuum compacting, to the laminate 122, such as the first laminate 122a. Alternatively, the one or more gap elements 134 (see FIG. 8A), such as in the form of laminated shims 135 (see FIG. 8A), may be coupled or attached to the longitudinal edges 146 (see FIG. 8A) of the first side 126b (see FIG. 8A) of the laminate 122, such as the second laminate 122b (see FIG. 8A).

Each gap element 134 (see FIG. 8A), such as the laminated shim 135 (see FIG. 8A), has a suitable width, length, and thickness dependent on the size of the laminates 122 (see FIG. 8A) and the size of the tool plates 150 (see FIG. 8A) used. For example, the gap element 134 (see FIG. 8A), such as the laminated shim 135 (see FIG. 8A), may have a width of about 0.05 inch, a length of about 24 inches long, and a thickness of about 5-15 plies. However, the gap element 134 (see FIG. 8A), such as the laminated shim 135 (see FIG. 8A), may also have another suitable width, length, and thickness. The length of the gap element 134, such as the laminated shim 135, is preferably slightly a shorter length than a length of each tool plate 150 used.

As shown in FIG. 8A, the first laminate 122a has longitudinal edges 146, such as in the form of a first longitudinal edge 147a, and a second longitudinal edge 147b opposite the first longitudinal edge 147a. Preferably, the second side 140a (see FIG. 8A) of the first gap element 134a (see FIG. 8A) is coupled or attached to the first longitudinal edge 147a (see FIG. 8A) on the first side 126a (see FIG. 8A) of the first laminate 122a (see FIG. 8A), and preferably, the second side 140b (see FIG. 8A) of the second gap element 134b (see FIG. 8A) is coupled to the second longitudinal edge 147*b* (see FIG. 8A) on the first side 126*a* (see FIG. 8A) of the first laminate 122*a*.

As further shown in FIG. 8A, the second laminate 122*b* has longitudinal edges 146, such as in the form of a first longitudinal edge 148*a*, and a second longitudinal edge 148*b* opposite the first longitudinal edge 148*a*. Preferably, the first side 138*a* (see FIG. 8A) of the first gap element 134*a* (see FIG. 8A) is adjacent to the first longitudinal edge 148*a* (see FIG. 8A) on the first side 126*b* (see FIG. 8A) of the second laminate 122*b* (see FIG. 8A), and preferably, the first side 138*b* (see FIG. 8A) of the second gap element 134*b* (see FIG. 8A) is coupled to the second longitudinal edge 148*b* (see FIG. 8A) on the first side 126*a* (see FIG. 8A) of the second laminate 122*b*, when the first laminate 122*a* and the second laminate 122*b* are coupled together.

Alternatively, the first gap element 134*a* (see FIG. 8A), such as in the form of laminated shim 135 (see FIG. 8A), may be coupled or attached to the first longitudinal edge 148*a* (see FIG. 8A) on the first side 126*b* (see FIG. 8A) of the second laminate 122*b* (see FIG. 8A), and the second gap element 134*b* (see FIG. 8A), such as in the form of laminated shim 135 (see FIG. 8A), may be coupled or attached to the second longitudinal edge 148*b* (see FIG. 8A) of the first side 126*b* (see FIG. 8A) of the second laminate 122*b* (see FIG. 8A).

As shown in FIGS. 8A-8B, two gap elements 134, such as in the form of laminated shims 135, are coupled to, or configured to be coupled to, the first laminate 122*a*, and are positioned opposite each other, along the longitudinal edges 146 of the first laminate 122*a*. The one or more gap elements 134, such as in the form of laminated shims 135, may be positioned in various positions or configurations to allow a user to control the size of the depth 114 (see FIGS. 7, 9) and the length 116 (see FIGS. 7, 9) of the one or more interlaminar corrugations 100 (see FIGS. 7, 8C, 9) that are formed during consolidation 204 (see FIG. 9) and curing 206 (see FIG. 9) of the laminate assembly 120 (see FIG. 9). Although two gap elements 134, such as in the form of laminated shims 135, are shown in FIGS. 8A-8B, alternatively, one gap element 134, such as the laminated shim 135, may be coupled to one longitudinal edge 146 of the laminates 122, such as the first longitudinal edge 147*a* (see FIG. 8A) or the second longitudinal edge 147*b* (see FIG. 8A) of the first laminate 122*a* (see FIG. 8A), or one gap element 134 may be coupled to the first longitudinal edge 148*a* (see FIG. 8A) or the second longitudinal edge 148*b* (see FIG. 8A) of the second laminate 122*b* (see FIG. 8A).

As shown in FIGS. 8A-8B, the system 172 (see FIG. 8B) further comprises a pair of end plates 160, such as a first end plate 160*a* and a second end plate 160*b*. The end plates 160 (see FIG. 8A) are preferably in the form of aluminum bars 161 (see FIG. 8A). However, the end plates 160 (see FIG. 8A) may be made of steel or another suitable metal material, a ceramic material, a composite material, or other materials designed for consolidation and curing processes to form laminated composite structures.

As shown in FIG. 8A, the first end plate 160*a* comprises a top side 162*a* and a bottom side 164*a*, and the second end plate 160*b* comprises a top side 162*b* and a bottom side 164*b*. As further shown in FIG. 8A, the end plates 160, such as the first end plate 160*a* and the second end plate 160*b*, each comprise a first end 166*a*, a second end 166*b*, a first side 168*a*, and a second side 168*b*.

As shown in FIG. 8B, the first end plate 160*a* and the second end plate 160*b* are preferably coupled to opposite sides 121 of the laminate assembly 120. For example, the first end plate 160*a* and the second end plate 160*b* may be positioned, respectively, against opposite sides 121 of the laminate assembly 120, where the laminate assembly 120 may be wrapped with a film layer 170, such as a first film layer 170*a*. As shown in FIG. 8B, the first end plate 160*a* is positioned against or adjacent to the first side 121*a* of the laminate assembly 120, which is wrapped with the first film layer 170*a*, and the second end plate 160*b* is positioned against or adjacent to the second side 121*b* of the laminate assembly 120. The first end plate 160*a* (see FIGS. 8A-8B) and the second end plate 160*b* (see FIGS. 8A-8B), are preferably positioned, respectively, against opposite sides 121 (see FIG. 8B) of the laminate assembly 120 (see FIG. 8B), to secure the laminate assembly 120 within a vacuum bagging assembly 175 (see FIG. 8B) of a pressurizing system 174 (see FIG. 8B), and to facilitate a flow direction 214 (see FIG. 9) of resin material 108 (see FIGS. 8A, 8C, 9) and of fiber material 107 (see FIGS. 8A, 8C, 9), of the composite material 106 (see FIGS. 8A, 8C, 9), of the laminate assembly 120, into the gap area 145 (see FIG. 8B), during consolidation 204 (see FIG. 9) and curing 206 (see FIG. 9) of the laminate assembly 120.

As further shown in FIGS. 8A-8B, the laminate assembly 120 may be wrapped with a film layer 170, such as the first film layer 170*a*, prior to positioning the end plates 160 against the laminate assembly 120, and prior to vacuum bagging the laminate assembly 120. The film layer 170 (see FIGS. 8A-8B), such as the first film layer 170*a* (see FIGS. 8A-8B), may preferably comprise a fluorinated ethylene propylene (FEP) film layer 171 (see FIGS. 8A-8B), or another suitable polymer film or flexible film material, such as ethylene tetrafluoroethylene (ETFE), polytetrafluoroethylene (PTFE), polyvinyl fluoride (PVF), or other polymer films.

As shown in FIG. 8B, the system 172 further comprises a pressurizing system 174 coupled to the assembled laminate assembly 120. The pressurizing system 174 (see FIG. 8B) preferably comprises a vacuum seal system 174*a* (see FIG. 8B) comprising a vacuum bagging assembly 175 (see FIG. 8B) and a vacuum pump assembly 183 (see FIG. 8B). As shown in FIG. 8B, the vacuum bagging assembly 175 may comprise one or more film layers 170, such as the first film layer 170*a* and a second film layer 170*b*. The film layers 170 (see FIG. 8), such as the first film layer 170*a* (see FIG. 8B) and the second film layer 170*b* (see FIG. 8B), may preferably each comprise a fluorinated ethylene propylene (FEP) film layer 171 (see FIGS. 8A, 9) having a thickness of about 2 mil. The film layers 170 may also comprise another suitable polymer film or flexible film material.

As shown in FIG. 8B, the first film layer 170*a* is preferably wrapped around the laminate assembly 120, including the laminates 122, the gap elements 134, and the tool plates 150. As further shown in FIG. 8B, the second film layer 170*b* is preferably wrapped around the end plates 160, and the laminate assembly 120, which is wrapped with the first film layer 170*a*.

As shown in FIG. 8B, the vacuum bagging assembly 175 may further comprise one or more breather material layers 176, such as a first breather material layer 176*a* and a second breather material layer 176*b*. The breather material layers 176 may each comprise a perforated cloth or fabric material, or another suitable breather material. For example, the first breather material layer 176*a* may comprise a 10 ounce breather material, and the second breather material layer 176*b* may comprise a 4 ounce breather material or a 10 ounce breather material. The first breather material layer 176*a* and the second breather material layer 176*b* may also comprise other suitable breather materials.

As shown in FIG. 8B, the first breather material layer 176*a* is adjacent the second film layer 170*b* and is wrapped around the second film layer 170*b*, the end plates 160, and the laminate assembly 120, which is wrapped with the first film layer 170*a*. As further shown in FIG. 8B, the second breather material layer 176*b* is optional and may be positioned on a flat surface apparatus 182, such as a table 182*a*, for example, a compaction table, or other flat surface, as a protection layer to protect the vacuum bagged laminate assembly 120. As shown in FIG. 8B, the laminate assembly 120 and end plates 160 that are vacuum bagged are positioned on the second breather material layer 176*b* which is positioned on the flat surface apparatus 182, such as the table 182*a*.

As shown in FIG. 8B, the vacuum bagging assembly 175 may further comprise a vacuum bag film 178. The vacuum bag film 178 (see FIG. 8B) may comprise a nylon film 178*a* (see FIG. 8B) having a thickness of about 3 mil. The vacuum bag film 178 may also comprise another suitable flexible film material, such as silicone, silicone rubber, or polyimide, having another suitable thickness. As further shown in FIG. 8B, the vacuum bag film 178 is adjacent the first breather material layer 176*a*, and is wrapped around the first breather material layer 176*a*, the second film layer 170*b*, the end plates 160, and the laminate assembly 120, which is wrapped with the first film layer 170*a*.

As shown in FIG. 8B, the vacuum bagging assembly 175 may further comprise a sealant material 180. The sealant material 180 (see FIG. 8B) may comprise a sealant tape 180*a* (see FIG. 8B), such as polytetrafluoroethylene (PTFE) tape, a polyester tape with a silicone adhesive or a rubber adhesive, a release tape, an adhesive material such as a pressure sensitive adhesive (PSA) with or without a release liner, or another suitable sealant tape. The sealant material 180 may also comprise another suitable sealant material. As shown in FIG. 8B, the sealant material 180 may be used to seal portions of the vacuum bag film 178 together around the first breather material layer 176*a*, the second film layer 170*b*, the end plates 160, and the laminate assembly 120, which is wrapped with the first film layer 170*a*.

As shown in FIG. 8B, the pressurizing system 174, such as the vacuum seal system 174*a*, of the system 172 preferably comprises the vacuum pump assembly 183. The vacuum pump assembly 183 (see FIG. 8B) is coupled to the vacuum bagging assembly 175 (see FIG. 8B). As shown in FIG. 8B, the vacuum pump assembly 183 comprises one or more vacuum ports 184, such as in the form of a first vacuum port 184*a* and a second vacuum port 184*b*. The vacuum ports 184 (see FIG. 8B) may be inserted through the vacuum bag film 178 (see FIG. 8B) and attached through the first breather material layer 176*a* (see FIG. 8B). Although two vacuum ports 184 are shown in FIG. 8B, the vacuum pump assembly 183 may include only one vacuum port 184, or the vacuum pump assembly 183 may include more than two vacuum ports 184.

As shown in FIG. 8B, the vacuum pump assembly 183 may further comprise one or more vacuum lines 186. The vacuum lines 186 preferably connect the one or more vacuum ports 184 to a trap member 188, to a gauge member 190, to one or more control valves 192, and to a vacuum pump 194.

When the pressurizing system 174 (see FIG. 8B) pressurizes the laminate assembly 120 (see FIG. 8B), a high pressure region 196 (see FIG. 8B) is created at and around the gap elements 134 (see FIG. 8B), or where there is no gap area 145 (see FIG. 8B), and a low pressure region 198 (see FIG. 8B) is created in the gap area 145 (see FIG. 8B) between the first laminate 122*a* (see FIG. 8B) and second laminate 122*b* (see FIG. 8B). The low pressure region 198 (see FIG. 8B) facilitates the formation of the one or more interlaminar corrugations 100 (see FIG. 8C) during consolidation 204 (see FIG. 9) and curing 206 (see FIG. 9) of the laminate assembly 120 (see FIG. 8B). The low pressure region 198 (see FIG. 8B) facilitates or causes a flow direction 214 (see FIG. 9) of the resin material 108 (see FIGS. 8A, 8C, 9) and of the fiber material 107 (see FIGS. 8A, 8C, 9), of the composite material 106 (see FIGS. 8A, 8C, 9), into the gap area 145, that is, a migration or movement of the resin material 108 and of the fiber material 107, from the laminates 122, into the gap area 145 during consolidation 204 and curing 206. The flow or migration of the resin material 108 (see FIG. 9) and the fiber material 107 (see FIG. 9) into the gap area 145, along with the low pressure in the low pressure region 198, causes distortion of one or more fibers of the fiber material 107 (see FIG. 9) of the composite material 106 (see FIG. 9), which results in formation of the one or more interlaminar corrugations 100 (see FIG. 8C). The pressure used in the low pressure region 198 and the pressure used in the high pressure region 196 depend on the composite material 106 (see FIG. 9) used, or composite material system used, for the laminate assembly 120 (see FIG. 9). For example, in certain composite material 106 systems, a pressure differential between the low pressure region 198 and the high pressure region 196 may be lower or small, such as 5 psi (pounds per square inch) to 10 psi, whereas in other composite material 106 systems, the pressure differential between the low pressure region 198 and the high pressure region 196 may be greater or large, such as 50 psi (pounds per square inch) to 100 psi.

As discussed above, the end plates 160 (see FIGS. 8A-8B), such as the first end plate 160*a* (see FIGS. 8A-8B) and the second end plate 160*b* (see FIGS. 8A-8B), further facilitate the flow direction 214 (see FIG. 9) of the resin material 108 (see FIGS. 8A, 8C, 9) and of the fiber material 107 (see FIGS. 8A, 8C, 9), of the composite material 106 (see FIGS. 8A, 8C, 9), of the laminate assembly 120 (see FIGS. 8A-8B), into the gap area 145 (see FIG. 8B), during consolidation 204 (see FIG. 9) and curing 206 (see FIG. 9) of the laminate assembly 120. The end plates 160 (see FIGS. 8A-8B) form a barrier against the laminates 122, which prevents, or substantially prevents, the resin material 108 (see FIG. 8A) and the fiber material 107 from flowing outwardly from the laminate assembly 120, and instead, facilitates inward flow of the resin material 108 and fiber material 107 into the gap area 145 and into the low pressure region 198 during consolidation 204 and curing 206.

As used herein, "consolidation" or "consolidate" means compressing or squeezing the laminate assembly 120 together under pressure and heat to result in flow or migration of the resin material 108 and the fiber material 107, and wetting of the composite material 106, such as wetting of the reinforcing fiber material 107, of the composite material 106, to form the laminated composite structure 10. As used herein, "curing" or "cure" means hardening or toughening the laminate assembly 120 under heat and pressure to form the laminated composite structure 10.

FIG. 8C shows the formed laminated composite structure 10 with the interlaminar corrugations 100 formed using the system 172 (see FIG. 8B). As shown in FIG. 8C, the laminated composite structure 10 comprises the plurality of stacked layers 102, or plies, comprised of the composite material 106. The composite material 106 (see FIG. 8C)

comprises the resin material 108 (see FIG. 8C), or polymer matrix, reinforced with the fiber material 107 (see FIG. 8C). The plurality of stacked layers 102 (see FIG. 8C) have the interlaminar corrugations 100 (see FIG. 8C) formed within the plurality of stacked layers 102. Each interlaminar corrugation 100 (see FIG. 8C) has a substantially sinusoidal shaped profile 101 (see FIG. 8C), or wavy configuration, having peaks 110 and valleys 112. The laminated composite structure 10 (see FIGS. 8C, 9) with the interlaminar corrugations 100 (see FIG. 8C) preferably has an improved strength 202 (see FIG. 9) and an improved impact damage resistance 200 (see FIG. 9) at the exposed edge 80 (see FIGS. 6A-6D, 9), such as the exposed vertical outer edge 80*a* (see FIGS. 6A-6D, 9) of the laminated composite structure 10, when the exposed edge 80, such as the exposed vertical outer edge 80*a*, is subjected to one or more impact forces 88 (see FIG. 9), for example, impact forces 88*a*, 88*b* (see FIG. 5A), such as from an object or objects (not shown).

Now referring to FIG. 9, FIG. 9 is an illustration of a functional block diagram showing exemplary versions of a system 172 for forming the laminated composite structure 10 having the interlaminar corrugations 100, and showing the formed laminated composite structures 10 having the interlaminar corrugations 100. As shown in FIG. 9, and as discussed in detail above with respect to FIG. 8B, the system 172 comprises the laminate assembly 120 coupled to the pressurizing system 174. As further shown in FIG. 9, the laminate assembly 120 preferably comprises two laminates 122, such as a first laminate 122*a* (see FIG. 8A) and a second laminate 122*b* (see FIG. 8A), coupled together, and comprises one or more gap elements 134, such as in the form of laminated shims 135, coupled between the two laminates 122 to form the gap area 145. As further shown in FIG. 9, the laminate assembly 120 may further comprise tool plates 150, such as the first tool plate 150*a* (see FIG. 8A) coupled to the first laminate 122*a* (see FIG. 8A), and the second tool plate 150*b* (see FIG. 8A) coupled to the second laminate 122*b* (see FIG. 8A). A pair of end plates 160 (see FIG. 9), such as the first end plate 160*a* (see FIG. 8A) and the second end plate 160*b* (see FIG. 8A), are preferably positioned against opposite sides 121 (see FIG. 8B) of the laminate assembly 120 (see FIGS. 8A, 9), which is in a stacked configuration 133 (see FIG. 9).

As further shown in FIG. 9, the pressurizing system 174, as discussed in detail above, comprises the vacuum seal system 174*a* comprising the vacuum bagging assembly 175 and the vacuum pump assembly 183. As shown in FIG. 9, and as discussed in detail above, the vacuum bagging assembly 175 comprises one or more film layers 170, such as the first film layer 170*a* (see FIG. 8B) and the second film layer 170*b* (see FIG. 8B), and preferably, the film layers 170 each comprise a fluorinated ethylene propylene (FEP) film layer 171. As shown in FIG. 9, and as discussed in detail above, the vacuum bagging assembly 175 further comprises one or more breather material layers 176, such as the first breather material layer 176*a* (see FIG. 8B) and the second breather material layer 176*b* (see FIG. 8B), comprises the vacuum bag film 178, and comprises the sealant material 180. The laminate assembly 120 (see FIG. 9) is preferably coupled within the vacuum bagging assembly 175 of the pressurizing system 174, and is preferably positioned on the flat surface apparatus 182 (see FIGS. 8B, 9), such as the table 182*a* (see FIG. 8B), for example, a compaction table, or another suitably flat surface.

As shown in FIG. 9, and as discussed in detail above, the vacuum pump assembly 183 comprises one or more vacuum ports 184, such as in the form of first vacuum port 184*a* (see FIG. 8B) and second vacuum port 184*b* (see FIG. 8B), one or more vacuum lines 186, the trap member 188, the gauge member 190, one or more control valves 192, and the vacuum pump 194.

When the pressurizing system 174 (see FIG. 9) pressurizes the laminate assembly 120 (see FIG. 9), the high pressure regions 196 (see FIG. 9) are created at and around the gap elements 134, or where there is no gap area 145 (see FIG. 9), and the low pressure region 198 (see FIG. 9) is created in the gap area 145 (see FIG. 9) between the laminates 122 (see FIG. 9). As discussed above, the low pressure region 198 (see FIG. 9) facilitates the formation of the one or more interlaminar corrugations 100 (see FIG. 9) during consolidation 204 (see FIG. 9) and curing 206 (see FIG. 9) of the laminate assembly 120 (see FIG. 9), by facilitating the flow direction 214 (see FIG. 9) of the resin material 108 (see FIG. 9) and the fiber material 107 (see FIG. 9), of the composite material 106 (see FIG. 9), into the gap area 145 (see FIG. 9), which, along with the low pressure in the low pressure regions 198, cause distortion of one or more fibers of the fiber material 107 (see FIG. 9) of the composite material 106 (see FIG. 9), and result in formation of the one or more interlaminar corrugations 100 (see FIG. 9). The one or more fibers of the fiber material 107 may be oriented in such a way that the flow direction 214 (see FIG. 9) of the fiber material 107 and the resin material 108 may be transverse to the orientation of the one or more fibers of the fiber material 107.

As shown in FIG. 9, the consolidation 204 and curing 206 of the laminate assembly 120, to form the laminated composite structure 10 having the one or more interlaminar corrugations 100, is preferably performed at an effective pressure 208, an effective temperature 210, and for an effective time period 212. The effective pressure 208 used during consolidation 204 and curing 206 of the laminated composite structure 10 may vary depending on the composite material 106 system used, for example, for certain composite material systems, the pressure during consolidation 204 and curing 206 may vary from a partial atmospheric pressure of less than 14 psi (pounds per square inch) to, for example, thousands of psi for thermoplastics. The effective temperature 210 and effective time period 212 used during consolidation 204 and curing 206 of the laminated composite structure 10 may also vary depending on the composite material 106 system used, and may vary depending on the type of composite material 106 used, the flow characteristics of the composite material 106, such as the resin material 108 flow and the fiber material 107 flow, the viscosity characteristics of the composite material 106, the chemical change profile of the composite material 106, and other material properties of the composite material 106 and composite material system.

As shown in FIG. 9, the laminated composite structure 10 formed by the system 172 may comprise the laminated composite finished part 28, such as the laminated composite blade stringer 28*a*, the laminated composite skin panel 28*b*, the laminated composite spar 28*c*, the laminated composite flight control surface 28*d*, or another suitable laminated composite finished part 28. As further shown in FIG. 9, the laminated composite structure 10 formed by the system 172 may further comprise the laminated composite test coupon 11.

As shown in FIG. 9, the laminated composite structure 10 formed by the system 172 and formed by the laminates 122, such as the first laminate 122*a* (see FIG. 8A) and the second laminate 122*b* (see FIG. 8A), comprises the plurality of stacked layers 102, or plies, comprised of composite material 106. The composite material 106 (see FIG. 9) comprises the resin material 108 (see FIG. 9), or polymer matrix, reinforced with the fiber material 107 (see FIG. 9), as discussed above. As further shown in FIG. 9, the laminated composite structure 10 formed by the system 172 and formed by the laminates 122, such as the first laminate 122a (see FIG. 8A) and the second laminate 122b (see FIG. 8A), comprises one or more interlaminar corrugations 100. Each interlaminar corrugation 100 (see FIG. 9) preferably has a substantially sinusoidal shaped profile 101 (see FIGS. 8C, 9), or wavy configuration or shape, and each interlaminar corrugation 100 (see FIGS. 7, 8C, 9) has a depth 114 (see FIGS. 7, 9), such as a peak height 114a, has a length 116 (see FIGS. 7, 9), such as a distortion length 116a (see FIG. 9), and has a width 117 (see FIG. 9). The depth 114 (see FIG. 9), the length 116 (see FIG. 9), and the width 117 (see FIG. 9) are dependent on the size 103 (see FIG. 9) of the laminated composite structure 10 (see FIGS. 8C, 9) formed by the system 172. As further shown in FIG. 9, each interlaminar corrugation 100 has multiple peak and valley segments 109 comprised of alternating peaks 110 and valleys 112.

As shown in FIG. 9, the formed laminated composite structure 10 preferably has improved impact damage resistance 200 and improved strength 202, when the exposed edge 80, such as the exposed vertical outer edge 80a, is subjected to an impact force 88, or impact forces 88, for example, impact forces 88a, 88b (see FIG. 5A), from an object or objects (not shown). The formed and finished laminated composite structure 10 (see FIG. 9) is preferably used in a vehicle 12 (see FIG. 9), such as an aircraft 12a (see FIG. 9), or another suitable vehicle.

Figure 10:
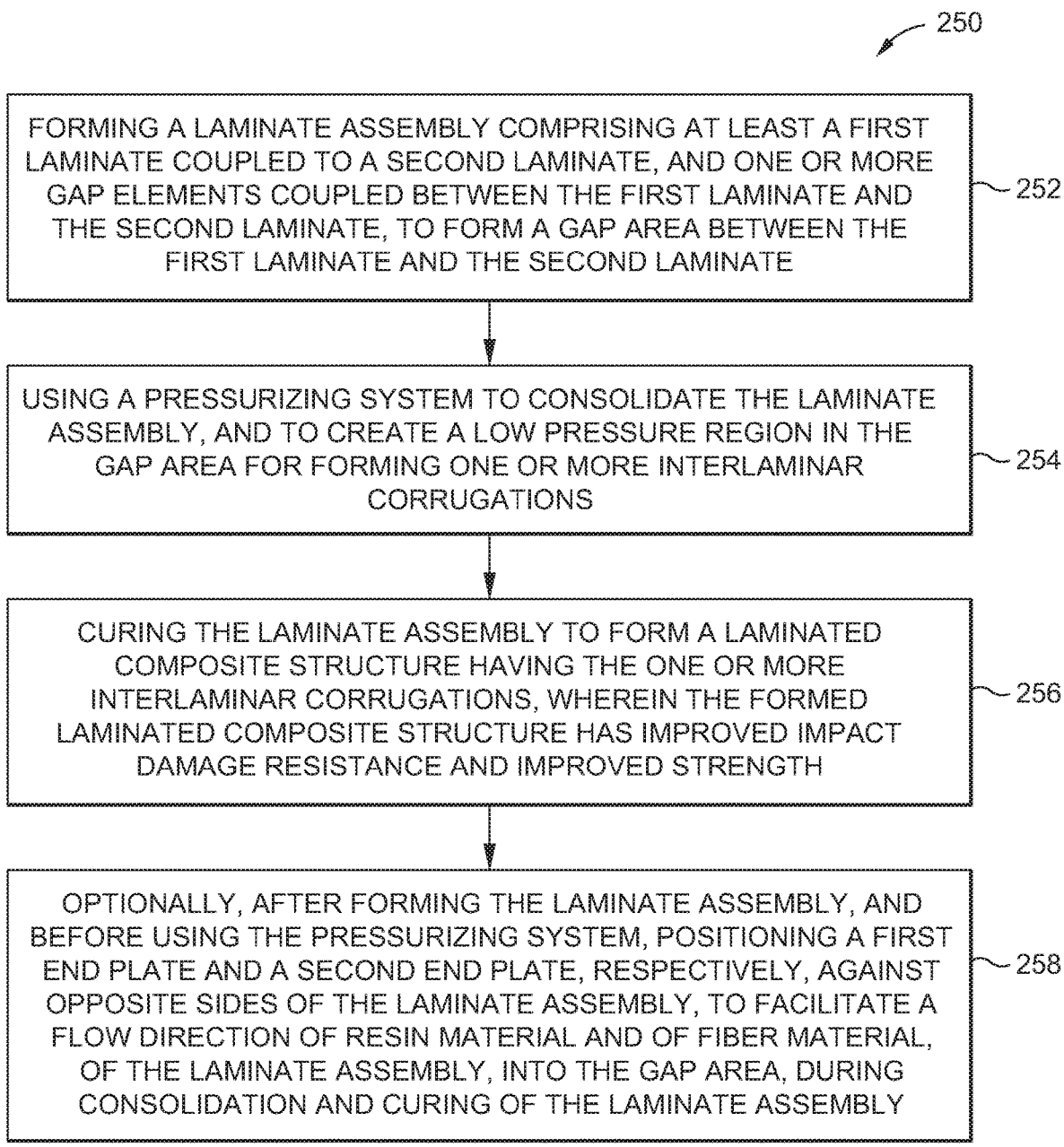
FIG. 10 is an illustration of a flow diagram of an exemplary version of a method of the disclosure of forming a laminated composite structure with interlaminar corrugations.

Now referring to FIG. 10, FIG. 10 is an illustration of a flow diagram of an exemplary version of a method 250 of the disclosure of forming the laminated composite structure 10 (see FIGS. 6A-6D, 8C) having one or more interlaminar corrugations 100 (see FIGS. 6A-6D, 8C), and having improved impact damage resistance 200 (see FIG. 9) and improved strength 202 (see FIG. 9). As discussed above, the laminated composite structure 10 (see FIG. 9) may comprise a laminated composite finished part 28 (see FIG. 9), such as the laminated composite blade stringer 28a (see FIG. 9), the laminated composite skin panel 28b (see FIG. 9), the laminated composite spar 28c (see FIG. 9), the laminated composite flight control surface 28d (see FIG. 9), or another suitable laminated composite finished part, or the laminated composite structure 10 may comprise the laminated composite test coupon 11 (see FIG. 9), or another suitable laminated composite structure.

As shown in FIG. 10, the method 250 comprises step 252 of forming a laminate assembly 120 (see FIGS. 8A-8B, 9). The laminate assembly 120 (see FIGS. 8A-8B, 9) comprises at least the first laminate 122a (see FIGS. 8A-8B, 9) coupled to the second laminate 122b (see FIGS. 8A-8B, 9). The laminate assembly 120 (see FIGS. 8A-8B, 9) further comprises one or more gap elements 134 (see FIGS. 8A-8B, 9) such as in the form of laminated shims 135 (see FIGS. 8A-8B, 9), coupled between the first laminate 122a and the second laminate 122b, to form the gap area 145 (see FIGS. 8B, 9) between the first laminate 122a (see FIGS. 8B, 9) and the second laminate 122b (see FIGS. 8B, 9). The step 252 (see FIG. 10) of forming the laminate assembly 120 (see FIGS. 8A-8B, 9) may further preferably comprise, before coupling the first laminate 122a (see FIGS. 8A-8B, 9) to the second laminate 122b (see FIGS. 8A-8B, 9), the step of coupling the first laminate 122a to the first tool plate 150a (see FIGS. 8A-8B, 9) and coupling the second laminate 122b to the second tool plate 150b (see FIGS. 8A-8B, 9).

The step 252 (see FIG. 10) of forming the laminate assembly 120 (see FIGS. 8A-8B, 9) of the method 250 (see FIG. 10) further comprises positioning and coupling two gap elements 134 (see FIGS. 8A-8B, 9), comprising laminated shims 135 (see FIGS. 8A, 9), opposite each other, along longitudinal edges 146 (see FIG. 8A) of the first laminate 122a (see FIG. 8A) (or the second laminate 122b (see FIG. 8A)), to control the depth 114 (see FIGS. 7, 9) and the length 116 (see FIGS. 7, 9) of the one or more interlaminar corrugations 100 (see FIGS. 6A-6D, 7, 8C) formed during consolidation 204 (see FIG. 9) and curing 206 (see FIG. 9) of the laminate assembly 120 (see FIGS. 8A-8B, 9).

As shown in FIG. 10, the method 250 further comprises step 254 of using a pressurizing system 174 (see FIGS. 8B, 9) to consolidate the laminate assembly 120 (see FIGS. 8B, 9), and to create a low pressure region 198 (see FIGS. 8B, 9) in the gap area 145 (see FIGS. 8B, 9), in order to form the one or more interlaminar corrugations 100 (see FIGS. 8C, 9). The step 254 (see FIG. 10) of using the pressurizing system 174 (see FIGS. 8B, 9) comprises coupling the pressurizing system 174 to and around the laminate assembly 120 (see FIGS. 8B, 9). As discussed above, the pressurizing system 174 (see FIGS. 8B, 9) comprises the vacuum seal system 174a (see FIGS. 8B, 9) comprised of the vacuum bag assembly 175 (see FIGS. 8B, 9) and the vacuum pump assembly 183 (see FIGS. 8B, 9).

As shown in FIG. 10, the method 250 further comprises step 256 of curing the laminate assembly 120 (see FIGS. 8A-8B, 9) to form the laminated composite structure 10 (see FIGS. 8C, 9) having the one or more interlaminar corrugations 100 (see FIGS. 8C, 9), wherein the formed laminated composite structure 10 (see FIGS. 8C, 9) has improved impact damage resistance 200 (see FIG. 9) and improved strength 202 (see FIG. 9), in particular, at the exposed edge 80 (see FIGS. 6A-6D, 9), such as the exposed vertical outer edge 80a (see FIGS. 6A-6D, 9) of the laminated composite structure 10 (see FIGS. 6A-6D, 9), when the exposed edge 80 is subjected to an impact force 88 (see FIG. 9), or impact forces 88, such as from an object or objects (not shown). The step 256 (see FIG. 10) of curing the laminate assembly 120 (see FIGS. 8A-8B, 9) to form the laminated composite structure 10 (see FIGS. 8C, 9), further comprises curing 256 (see FIG. 9) the laminate assembly 120 (see FIG. 9) to form the laminated composite structure 10 (see FIGS. 8C, 9) comprising one of, the laminated composite test coupon 11 (see FIG. 9), the laminated composite blade stringer 28a (see FIG. 9), the laminated composite skin panel 28b (see FIG. 9), the laminated composite spar 28c (see FIG. 9), the laminated composite flight control surface 28d (see FIG. 9), or another suitable laminated composite structure.

As shown in FIG. 10, the method 250 may further optionally comprise, after forming 252 the laminate assembly 120 (see FIGS. 8A-8B, 9), and before using 254 the pressurizing system 174, step 258 of positioning the first end plate 160a (see FIGS. 8A-8B, 9) and the second end plate (160b) (see FIGS. 8A-8B, 9), respectively, against opposite sides 121 (see FIG. 8B) of the laminate assembly 120 (see FIG. 8B), to facilitate a flow direction 214 (see FIG. 9) of resin material 108 (see FIG. 9) and of fiber material 107 (see FIG. 9), of the laminate assembly 120 (see FIGS. 8A-8B, 9), into the gap area 145 (see FIGS. 8B, 9), during consolidation 204 (see FIG. 9) and curing 206 (see FIG. 9) of the laminate assembly 120.

Example

In one example, a laminated composite structure 10 (see FIG. 9), such as a laminated composite test coupon 11 (see FIG. 9) was formed using a version of the disclosed system 172 (see FIG. 9).

Forming Laminate Assembly.

Two separate laminates 122, including a first laminate 122a (see FIG. 8A) and a second laminate 122b (see FIG. 8A), in the form of light gage laminates made of composite material and resin material, were formed on a layup apparatus, where each laminate represented one half of the total laminated composite test coupon 11 (see FIG. 9).

Two separate gap elements 134, such as in the form of two laminated shims 135, were constructed from multiple plies of zero degree (0°) unidirectional carbon fiber reinforced plastic (CFRP) tape, including a 5-ply (thickness) laminated shim for a light gage laminate for forming a small interlaminar corrugation 100c (see FIG. 6C), and including a 10-ply (thickness) laminated shim for a light gage laminate for forming a large interlaminar corrugation 100a (see FIG. 6A). The laminated shims 135 were formed on a layup apparatus. Each laminated shim 135 was trimmed to a size of 0.5 inch wide by 23.85 inches long.

Two (2) tool plates 150, including a first tool plate 150a (see FIG. 8A) and a second tool plate 150b (see FIG. 8A), each in the form of a rigid precision ground steel caul plate having a length of 24 inches, a width of 7 inches, and a thickness of 0.5 inch, were cleaned, prepared, and placed on a compaction table.

The first laminate 122a was located and aligned over the first tool plate 150a, and one side end or edge of the first laminate 122a was aligned flush to one side end or edge of the first tool plate 150a. The second laminate 122b was located and aligned over the second tool plate 150b, and one side end or edge of the second laminate 122b was aligned flush to one side end or edge of the second tool plate 150b.

The first laminate 122a and the second laminate 122b were covered with a fluorinated ethylene propylene (FEP) film layer to protect against contamination. The first laminate 122a was vacuum compacted to the first tool plate 150a using a 22 inch of mercury (Hg) pressure for 5 minutes, and the second laminate 122b was vacuum compacted to the second tool plate 150b using a 22 inch of mercury (Hg) pressure for 5 minutes.

The vacuum compacted first laminate/first tool plate and second laminate/second tool plate were moved to a flat work surface. The opposite side (non-flush side) of the first laminate 122a was trimmed with an ultrasonic knife so that it was flush to the opposite side of the first tool plate 150a. The opposite side (non-flush side) of the second laminate 122b was trimmed with the ultrasonic knife so that it was flush to the opposite side of the second tool plate 150b. The first laminate 122a and the second laminate 122b were checked to ensure that both side ends or edges of the respective first laminate 122a and the second laminate 122b were adequately trimmed, so that they were aligned flush to the respective first tool plate 150a and second tool plate 150b on both sides.

The two gap elements 134, such as in the form of the two laminated shims 135, were located and aligned along the longitudinal edges 146 (see FIG. 8A) of the first laminate 122a. The first gap element 134a (see FIG. 8A) was aligned flush along the first longitudinal edge 147a (see FIG. 8A) of the first laminate 122a (see FIG. 8A). The second gap element 134b (see FIG. 8A) was aligned flush along the second longitudinal edge 147b (see FIG. 8A) of the first laminate 122a.

The first gap element 134a and the second gap element 134b, such as in the form of laminated shims 135, were vacuum compacted to the first laminate 122a. The first laminate 122a with the vacuum compacted first gap element 134a and second gap element 134b was moved to a flat surface apparatus 182 (see FIG. 8B), such as a table 182a (see FIG. 8B).

The second laminate 122b with the attached second tool plate 150b attached to the bottom side of the second laminate 122b was aligned with and over the first laminate 122a with the vacuum compacted first and second gap elements 134a, 134b attached to the top side and the first tool plate 150a attached to the bottom side of the first laminate 122a, so that the first laminate 122a and the second laminate 122b were facing each other in the interior and the first tool plate 150a and the second tool plate 150b were facing outwardly on the exterior, to form the laminate assembly 120.

Vacuum Bagging the Laminate Assembly.

The formed laminate assembly 120 was envelope wrapped with a film layer 170 (see FIG. 9), such as a first film layer 170a (see FIG. 8B), in the form of a fluorinated ethylene propylene (FEP) film layer 171 (see FIG. 9) that was 2 mil thick. The first film layer in the form of the FEP film layer was secured around the formed laminate assembly with several pieces of polytetrafluoroethylene (PTFE) tape.

Two end plates 160 (see FIGS. 8A, 9), including a first end plate 160a (see FIG. 8A) and a second end plate 160b (see FIG. 8A), each in the form of an aluminum bar with a length of 24 inches, a width of 1 inch, and a thickness of 1.5 inches, was positioned against each opposite side 121 (see FIG. 8B) of the laminate assembly 120 (see FIG. 8B) that was wrapped with the film layer 170.

The two end plates 160 and the wrapped laminate assembly 120 were loosely wrapped with a second film layer 170b in the form of a fluorinated ethylene propylene (FEP) film layer 171 (see FIG. 9) that was 2 mil thick. The second film layer in the form of the FEP film layer was secured around the formed laminate assembly with several pieces of polytetrafluoroethylene (PTFE) tape. The second film layer in the form of the FEP film layer was checked to ensure that there was slack in the second film layer, such that it could fill the gap area 145 (see FIG. 8B) on the ends of the laminate assembly 120.

A vacuum port waffle portion of the vacuum ports 184 (see FIG. 8B), including such portion for a first vacuum port 184a (see FIG. 8B) and such portion for a second vacuum port 184b (see FIG. 8B), were optionally wrapped with a 10 ounce breather material and positioned at each end of the laminate assembly 120.

The laminate assembly 120 and the wrapped vacuum ports 184 were wrapped with a first breather material layer 176a in the form of a 10 ounce breather material layer, and the first breather material layer was secured with polytetrafluoroethylene (PTFE) tape. Vacuum port bases of the vacuum ports 184 (see FIG. 8B) were positioned and secured to the first breather material layer 176a.

A sealant material 180 (see FIG. 8B), in the form of a sealant tape 180a (see FIG. 8B) was applied in a U-shaped configuration to a vacuum bag film 178, in the form of a nylon film 178a (see FIG. 8B), having a thickness of 3 mil. An edge of the vacuum bag film with the sealant tape was folded to the center of the laminate assembly 120 and end plates 160 wrapped with the second film layer 170b and the first breather material layer 176a. The edge was reverse folded to expose release paper on the sealant tape. An opposite edge of the vacuum bag film was folded to the center of the wrapped laminate assembly. The release paper was removed, and the vacuum bag was sealed in the center of the wrapped laminate assembly, and at the ends of the vacuum bag film.

The vacuum ports 184 (see FIG. 8B) were inserted through the vacuum bag film 178 (see FIG. 8B), and a vacuum was drawn with a vacuum pump assembly 183 (see FIG. 8B), and a check for any leaks was made. For this example, the vacuum bagged laminate assembly was consolidated and cured at an effective pressure of about 90 psi (ninety pounds per square inch), and at an effective temperature of about 355 degrees Fahrenheit, for an effective period of time of about two (2) hours, to obtain a laminated composite structure 10 with interlaminar corrugations 100 (see FIGS. 8C, 9). However, the effective pressure, effective temperature, and effective time will vary depending on the composite material system used.

Impact and Compression Testing.

The finished and formed laminated composite structure 10 with the interlaminar corrugations 100, in the exemplary form of the laminated composite test coupon 11 (see FIG. 9) with the interlaminar corrugations 100, were formed as set forth above, and were tested for impact and compression load, and tested against controls of laminated composite structures 10 without interlaminar corrugations 100, such as in the form of laminated composite test coupons without interlaminar corrugations, that were also tested for impact and compression load.

A high speed impact testing apparatus with a heavy impact fixture of approximately 300 pounds was used to perform the impact testing. All test specimens were impacted with the same impact energy or force. The impact testing was performed on the following test specimens, in the form of laminated composite test coupons: (1) laminated composite test coupons of light gage 32-ply and medium gage 66-ply laminate coupon types, having large interlaminar corrugations 100 (see FIG. 6A) (0.030 inch corrugation size); (2) laminated composite test coupons of medium gage 66-ply laminate coupon type, having small interlaminar corrugations 100c (see FIG. 6C) (0.018 inch corrugation size); (3) control laminated composite test coupons of light gage 32-ply and medium gage 66-ply laminate coupon types, without interlaminar corrugations; (4) laminated composite test coupons of light gage 32-ply and medium gage 66-ply laminate coupon types, having large interlaminar corrugations 100 (see FIG. 6A) (0.030 inch corrugation size), and including an edge covering 104 (see FIG. 6C), or cap treatment; (5) laminated composite test coupons of light gage 32-ply and medium gage 66-ply laminate coupon types, having small interlaminar corrugations 100c (see FIG. 6C) (0.018 inch corrugation size), and including an edge covering 104 (see FIG. 6C), or cap treatment; and (6) control laminated composite test coupons of light gage 32-ply and medium gage 66-ply laminate coupon types, without interlaminar corrugations, and including an edge covering 104 (see FIG. 6C), or cap treatment.

Compression testing was performed on the above laminated composite test coupons to determine their residual strength capability. A compression testing apparatus comprising a compression jacket fixture with a window, load platens, an adjustable base, and a load frame of 200 kip (kilopounds) maximum was used to perform the compression testing.

Results.

The results of the impact testing compared the impact damage size between the control test specimens without the interlaminar corrugations and the laminated composite test coupons with the interlaminar corrugations, and additionally with the edge covering or cap treatment. The results showed that the laminated composite test coupons of light gage 32-ply laminate coupon type having the large interlaminar corrugations had less damage (average size damage of 3.1×1.0 inches) than the control laminated composite test coupons of light gage 32-ply laminate coupon type without interlaminar corrugations (average size damage of 4.2×1.4 inches). In addition, the impact testing and compression testing showed that the laminated composite test coupons of medium gage 66-ply laminate coupon type having the large interlaminar corrugations had less damage (average size damage of 3.6×1.4 inches) than the control laminated composite test coupons of medium gage 66-ply laminate coupon type without interlaminar corrugations (average size damage of 3.8×1.4 inches).

In addition, a resulting increase in load carrying capability was found to be 29% greater for the light gage 32-ply laminate coupon type, as compared to the light gage 32-ply control laminate coupon without interlaminar corrugations, and a resulting increase in load carrying capability was found to be 10% greater for the medium gage 66-ply laminate coupon type, as compared to the medium gage 66-ply control laminate coupon without interlaminar corrugations.

In addition, the results of the impact testing and compression testing showed that the laminated composite test coupons with transverse interlaminar corrugations were more resistant to internal damage from impacts, and accordingly, demonstrated higher residual strength capabilities. Though impacted with the same energies, the internal delaminations in the laminated composite test coupons with interlaminar corrugations were smaller. The difference was largest for the light gage 32-ply laminated composite test coupons without cap treatment. In addition, the simple, expedient, and cost-effective testing demonstrated that transverse web interlaminar corrugations were not detrimental to laminated composite blade stringer 28a (see FIG. 9) barely visible impact damage (BVID), i.e., damage that cannot be reasonably detected by visual inspections, compression capability.

Disclosed embodiments of the laminated composite structure 10 (see FIGS. 6A-6D, 8C, 9), and the system 172 (see FIGS. 8B, 9) and method 250 (see FIG. 10) of forming the laminated composite structure 10 (see FIGS. 6A-6D, 8C, 9) provide improved strength 202 (see FIG. 9) and improved impact damage resistance 200 (see FIG. 9) at an exposed edge 80 (see FIG. 9) of the laminated composite structure 10, when the exposed edge 80 is subjected to one or more impact forces 88 (see FIG. 9), for example, impact forces 88a, 88b (see FIG. 5A), from an object or objects (not shown). Utilizing intentional formation of the interlaminar corrugations 100 (see FIGS. 6A-6D, 8C, 9) for the benefit of impact damage resistance avoids implementing more costly secondary structures, such as structural overwraps and stitching, to the laminated composites, thus requiring less manufacturing steps, which, in turn, may decrease the time, labor, and cost of manufacturing. Moreover, the intentional formation of the interlaminar corrugations 100 (see FIGS. 6A-6D, 8C, 9) obviates the need to eliminate them for the sake of impact damage performance, if they already exist in the production process because they provide a benefit not a detriment. Further, although the disclosed laminated composite structures 10 with the interlaminar corrugations 100, for example, small interlaminar corrugations 100c (see FIG.

6C), may be used with an edge covering 104 (see FIG. 6C), such edge covering is optional and not required. This may decrease the cost of manufacturing if the additional edge coverings can be avoided, and may require less manufacturing steps, which, in turn, may decrease the time, labor, and cost of manufacturing.

In addition, disclosed embodiments of the laminated composite structure 10 (see FIGS. 6A-6D, 8C, 9), and the system 172 (see FIGS. 8B, 9) and method 250 (see FIG. 10) provide laminated composite structure 10 with interlaminar corrugations 100 that may be easily integrated into the primary fabrication or formation processes without secondary steps or added material costs. Moreover, the transverse web interlaminar corrugations 100 were found to not be detrimental to laminated composite blade stringer 28a (see FIG. 9) barely visible impact damage (BVID).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A system for forming a laminated composite structure having one or more interlaminar corrugations, and having improved impact damage resistance and improved strength, the system comprising:
    a laminate assembly comprising:
        a first laminate coupled to a second laminate, the first laminate coupled to a first tool plate and the second laminate coupled to a second tool plate, the first tool plate having a first side and a second side, each having a planar profile, and the second tool plate having a first side and a second side, each having a planar profile, and wherein the first laminate and the second laminate are positioned between the first tool plate and the second tool plate in a stacked configuration with the first tool plate separate from the second tool plate; and
        one or more gap elements coupled between the first laminate and the second laminate, the one or more gap elements forming a gap area between the first laminate and the second laminate, the one or more gap elements and the first laminate and the second laminate comprising a same composite material; and
    a pressurizing system coupled to the laminate assembly, to create a low pressure region in the gap area for forming the one or more interlaminar corrugations, during consolidation and curing of the laminate assembly, and to form the laminated composite structure having the one or more interlaminar corrugations formed within a plurality of stacked layers of the laminated composite structure, and each of the one or more interlaminar corrugations of the laminated composite structure having a substantially sinusoidal shaped profile,
    wherein the laminated composite structure with the one or more interlaminar corrugations has improved strength and improved impact damage resistance at an exposed edge of the laminated composite structure, when the exposed edge is subjected to an impact force.

2. The system of claim 1 further comprising a first end plate and a second end plate, positioned, respectively, against opposite sides of the laminate assembly, to secure the laminate assembly within the pressurizing system, and to facilitate a flow direction of resin material and of fiber material, of the laminate assembly, into the gap area, during consolidation and curing of the laminate assembly.

3. The system of claim 1 wherein each of the one or more interlaminar corrugations has a depth and a length dependent on a size of the laminated composite structure formed.

4. The system of claim 3 wherein the depth of each interlaminar corrugation, of the laminated composite structure formed by the system, is in a range of from 0.01 inch to 0.35 inch, and wherein the length of each interlaminar corrugation, of the laminated composite structure formed by the system, is in a range of from 0.20 inch to 0.60 inch.

5. The system of claim 1 wherein the one or more gap elements of the laminate assembly comprise two laminated shims positioned opposite each other, along longitudinal edges of the first laminate, to control a depth and a length of the one or more interlaminar corrugations formed during consolidation and curing of the laminate assembly.

6. The system of claim 1 wherein the pressurizing system comprises a vacuum seal system having a vacuum bagging assembly and a vacuum pump assembly, the vacuum bagging assembly comprising a first film layer, a second film layer, a first breather material layer, a vacuum bag film, and a sealant material.

7. The system of claim 1 wherein the laminated composite structure comprises one of, a laminated composite test coupon, a laminated composite blade stringer, a laminated composite skin panel, a laminated composite spar, and a laminated composite flight control surface.

8. A method of forming a laminated composite structure having one or more interlaminar corrugations, and having improved impact damage resistance and improved strength, the method comprising the steps of:
    coupling a first laminate to a first tool plate, the first tool plate having a first side and a second side, each having a planar profile;
    coupling a second laminate to a second tool plate, the second tool plate having a first side and a second side, each having a planar profile;
    coupling the first laminate to the second laminate, so that the first laminate and the second laminate are positioned between the first tool plate and the second tool plate in a stacked configuration with the first tool plate separate from the second tool plate;
    coupling one or more gap elements coupled between the first laminate and the second laminate to form a laminate assembly and to form a gap area between the first laminate and the second laminate, the one or more gap elements and the first laminate and the second laminate comprising a same composite material;
    using a pressurizing system to consolidate the laminate assembly, and to create a low pressure region in the gap area for forming the one or more interlaminar corrugations; and
    curing the laminate assembly to form the laminated composite structure having the one or more interlaminar corrugations formed within a plurality of stacked layers of the laminated composite structure, and each of the one or more interlaminar corrugations of the laminated composite structure having a substantially sinusoidal shaped profile, wherein the formed laminated composite structure has improved impact damage resistance and improved strength.

9. The method of claim 8 wherein before using the pressurizing system, positioning a first end plate and a second end plate, respectively, against opposite sides of the laminate assembly, to facilitate a flow direction of resin material and of fiber material, of the laminate assembly, into the gap area, during consolidation and curing of the laminate assembly.

10. The method of claim 8 wherein coupling the first laminate to the first tool plate further comprises aligning the first laminate over the first tool plate, so that a side end of the first laminate is aligned flush to a side of the first tool plate, and further wherein coupling the second laminate to the second tool plate further comprises aligning the second laminate over the second tool plate, so that a side end of the second laminate is aligned flush to a side of the second tool plate.

11. The method of claim 8 wherein coupling the one or more gap elements further comprises positioning and coupling two gap elements opposite each other, along longitudinal edges of the first laminate, to control a depth and a length of the one or more interlaminar corrugations formed during consolidation and curing of the laminate assembly.

12. The method of claim 8 wherein using the pressurizing system comprises coupling the pressurizing system to and around the laminate assembly, the pressurizing system comprising a vacuum seal system with a vacuum bag assembly and a vacuum pump assembly.

13. The method of claim 8 wherein curing the laminate assembly to form the laminated composite structure, further comprises curing the laminate assembly to form the laminated composite structure comprising one of, a laminated composite test coupon, a laminated composite blade stringer, a laminated composite skin panel, a laminated composite spar, and a laminated composite flight control surface.

14. A system for forming a laminated composite structure having one or more interlaminar corrugations, and having improved impact damage resistance and improved strength, the system comprising:
  a laminate assembly comprising:
    a first laminate coupled to a second laminate, the first laminate coupled to a first tool plate and the second laminate coupled to a second tool plate, the first tool plate having a first side and a second side, each having a planar profile, and the second tool plate having a first side and a second side, each having a planar profile, and wherein the first laminate and the second laminate are positioned between the first tool plate and the second tool plate in a stacked configuration with the first tool plate separate from the second tool plate; and
    two laminated shims positioned opposite each other, along longitudinal edges of the first laminate, the two laminated shims coupled between the first laminate and the second laminate, and forming a gap area between the first laminate and the second laminate, the two laminated shims and the first laminate and the second laminate comprising a same composite material; and
  a pressurizing system coupled to the laminate assembly, to create a low pressure region in the gap area for forming the one or more interlaminar corrugations, during consolidation and curing of the laminate assembly, and to form the laminated composite structure having the one or more interlaminar corrugations formed within a plurality of stacked layers of the laminated composite structure,
  wherein the laminated composite structure with the one or more interlaminar corrugations has improved strength and improved impact damage resistance at an exposed edge of the laminated composite structure, when the exposed edge is subjected to an impact force.

15. The system of claim 14 wherein each of the one or more interlaminar corrugations of the laminated composite structure has a substantially sinusoidal shaped profile.

16. The system of claim 14 wherein each of the one or more interlaminar corrugations of the laminated composite structure has a depth and a length dependent on a size of the laminated composite structure formed.

17. The system of claim 16 wherein the depth of each of the one or more interlaminar corrugations is in a range of from 0.01 inch to 0.35 inch.

18. The system of claim 16 wherein the length of each of the one or more interlaminar corrugations is in a range of from 0.20 inch to 0.60 inch.

19. The system of claim 14 wherein the laminated composite structure comprises one of, a laminated composite blade stringer, a laminated composite skin panel, a laminated composite spar, a laminated composite flight control surface, and a laminated composite test coupon.

20. The system of claim 19 wherein the laminated composite structure comprises the laminated composite blade stringer, and further wherein the one or more interlaminar corrugations are transverse to a web of the laminated composite blade stringer.

* * * * *